US012560136B2

(12) United States Patent
Aoun et al.

(10) Patent No.: US 12,560,136 B2
(45) Date of Patent: Feb. 24, 2026

(54) SYSTEM FOR SUPPLYING GAS TO AT LEAST ONE GAS-CONSUMING APPLIANCE EQUIPPING A SHIP

(71) Applicant: GAZTRANSPORT ET TECHNIGAZ, Saint Remy les Chevreuse (FR)

(72) Inventors: Bernard Aoun, Saint Remy les Chevreuse (FR); Romain Narme, Saint Remy les Chevreuse (FR); Martin Buissart, Saint Remy les Chevreuse (FR)

(73) Assignee: GAZTRANSPORT ET TECHNIGAZ, Saint Remy les Chevreuse (FR)

( * ) Notice: Subject to any disclaimer, the term of this patent is extended or adjusted under 35 U.S.C. 154(b) by 548 days.

(21) Appl. No.: 17/778,032

(22) PCT Filed: Nov. 17, 2020

(86) PCT No.: PCT/FR2020/052094
§ 371 (c)(1),
(2) Date: May 19, 2022

(87) PCT Pub. No.: WO2021/099726
PCT Pub. Date: May 27, 2021

(65) Prior Publication Data

US 2023/0032594 A1 Feb. 2, 2023

(30) Foreign Application Priority Data

Nov. 20, 2019 (FR) ...................................... 1912982

(51) Int. Cl.
*F02M 21/02* (2006.01)
*B63B 25/14* (2006.01)
(Continued)

(52) U.S. Cl.
CPC ......... *F02M 21/0221* (2013.01); *B63B 25/14* (2013.01); *B63B 27/24* (2013.01);
(Continued)

(58) Field of Classification Search
CPC .......... F17C 2221/033; F17C 2265/066; F17C 2227/0185; F17C 2270/0105;
(Continued)

(56) References Cited

U.S. PATENT DOCUMENTS

2004/0068993 A1* 4/2004 Irie .......................... F25J 1/023 62/48.2
2008/0110200 A1* 5/2008 Javerschek ............. F25B 9/008 62/515
2015/0316208 A1 11/2015 Bae et al.

FOREIGN PATENT DOCUMENTS

CN 112302843 A * 2/2021 ......... F02M 37/0076
EP 3 483 419 A1 5/2019
(Continued)

OTHER PUBLICATIONS

International Search Report issued Jan. 15, 2021 in PCT/FR2020/052094 filed on Nov. 17, 2020, 2 pages.

*Primary Examiner* — Jianying C Atkisson
*Assistant Examiner* — Brahim A. Michael Adeniji
(74) *Attorney, Agent, or Firm* — Oblon, McClelland, Maier & Neustadt, L.L.P.

(57) ABSTRACT

A system for supplying gas to at least one gas-consuming appliance equipping a ship, the supply system includes at least one gas supply line for supplying gas to the at least one gas consuming appliance, the gas supply line being configured to be traversed by gas taken in the liquid state from a tank and subjected to a pressure lower than a pressure of the gas in a headspace of the tank, a first compression member configured to compress the gas from the gas supply line for supplying gas to the at least one gas-consuming appliance,
(Continued)

a second compression member, characterized in that the first compression member and the second compression member alternately compress gas in the gaseous state from the gas supply line and gas taken in the gaseous state from the headspace of the tank.

18 Claims, 15 Drawing Sheets

(51) Int. Cl.

| | |
|---|---|
| ***B63B 27/24*** | (2006.01) |
| ***F02M 21/06*** | (2006.01) |
| ***F17C 9/00*** | (2006.01) |
| ***F25J 1/00*** | (2006.01) |
| ***F25J 1/02*** | (2006.01) |

(52) U.S. Cl.
CPC ............... *F02M 21/06* (2013.01); *F17C 9/00* (2013.01); *F25J 1/0025* (2013.01); *F25J 1/023* (2013.01); *F25J 1/0264* (2013.01); *F25J 1/0277* (2013.01); *F17C 2205/0323* (2013.01); *F17C 2205/0352* (2013.01); *F17C 2221/033* (2013.01); *F17C 2223/033* (2013.01); *F17C 2223/035* (2013.01); *F17C 2223/043* (2013.01); *F17C 2227/0135* (2013.01); *F17C 2227/0157* (2013.01); *F17C 2227/0178* (2013.01); *F17C 2227/0185* (2013.01); *F17C 2227/0306* (2013.01); *F17C 2227/0339* (2013.01); *F17C 2265/034* (2013.01); *F17C 2265/037* (2013.01); *F17C 2265/066* (2013.01); *F17C 2270/0105* (2013.01); *F25J 2235/60* (2013.01); *F25J 2290/62* (2013.01); *F25J 2290/72* (2013.01)

(58) Field of Classification Search
CPC .......... F25J 1/0025; F25J 1/023; F25J 1/0277; F02M 21/0221; F25B 5/02
See application file for complete search history.

(56) References Cited

FOREIGN PATENT DOCUMENTS

| | | | | | |
|---|---|---|---|---|---|
| FR | 3 066 257 | A1 | | 11/2018 | |
| FR | 3077867 | A1 | * | 8/2019 | ............ F17C 13/004 |
| JP | 2022126753 | A | * | 8/2022 | ................ F17C 6/00 |
| KR | 20160077277 | A | * | 7/2016 | ............. F02M 21/02 |
| WO | WO 2014/092369 | A1 | | 6/2014 | |

* cited by examiner

SYSTEM FOR SUPPLYING GAS TO AT LEAST ONE GAS-CONSUMING APPLIANCE EQUIPPING A SHIP

The present invention relates to the field of ships in which the engine(s) is/are powered by natural gas and which furthermore make it possible to contain and/or transport this liquefied natural gas.

Such ships typically include a tank containing natural gas in a liquid state. The natural gas is liquid at temperatures below −162° C., at atmospheric pressure. These tanks are never perfectly thermally insulated, such that the natural gas evaporates at least partially. Thus, these tanks contain both natural gas in liquid form and natural gas in gaseous form. This natural gas in gaseous form forms the headspace of the tank and the pressure of this headspace of the tank must be controlled so as not to damage the tank. As is known, at least some of the natural gas present in the tank in gaseous form is thus used to supply, among other things, the engine(s) of the ship.

However, when the ship is stopped, the consumption of natural gas by these engines is zero, or almost zero, as the natural gas present in the gaseous state in the tank is no longer consumed by these engines. Reliquefaction systems that allow the evaporated natural gas present in the tank to be condensed are therefore installed on the ship, in order to return it to this tank in a liquid state.

The systems for supplying the engines and reliquefying the gas that cannot be sent to these engines currently in use are very expensive. In particular, certain components of these supply systems are duplicated in order to ensure redundancy, that is to say to ensure continuous supply to the engines, even in the event of failure of one of these components. This is the case, for example, with compression devices that allow the gas to be compressed to pressures compatible with the needs of the engines. The present invention aims to solve this drawback by proposing a gas treatment system comprising fewer components than current systems, thus making it possible to reduce the implementation costs of such systems, while being at least as efficient.

The present invention thus relates to a system for supplying gas to at least one gas-consuming appliance equipping a ship, the supply system comprising at least:

- one gas supply line for supplying gas to the at least one gas-consuming appliance, said gas supply line being configured to be passed through by gas taken in the liquid state from a tank and subjected to a pressure lower than a pressure of the gas in a headspace of the tank,
- one first compression member configured to compress the gas from the gas supply line for supplying gas to the at least one gas-consuming appliance,
- one second compression member.

According to the invention, the first compression member and the second compression member alternately compress gas in the gaseous state from the gas supply line and gas taken in the gaseous state from the headspace of the tank.

Advantageously, the first compression member and the second compression member are configured to independently supply the at least one gas-consuming appliance. It is understood here that the two compression members are configured to ensure the supply of compressed gas to the gas-consuming appliance. The two compression members are thus redundant with respect to each other.

The ship includes the tank configured to contain the liquefied gas. The term "headspace of the tank" means a portion of the tank in which gas in a gaseous state generated by natural evaporation of gas present in a liquid state in the remainder of the tank accumulates. The term "tank bottom" means a portion of the tank which extends from a bottom wall of this tank and a plane parallel to this bottom wall and arranged, at most, at 20% of a total height of the tank, this total height being measured along a straight line perpendicular to the bottom wall of the tank between two opposite ends of this tank, along the length of this straight line. Advantageously, the plane parallel to the bottom wall which participates in delimiting the "bottom of the tank" can be arranged at 10% of the total height of the tank.

The at least one evaporated-gas-consuming appliance can, for example, be a DFDE (Dual Fuel Diesel Electric) generator, that is to say a gas-consuming appliance configured to provide electrical power to the ship, or a ship propulsion engine, such as an ME-GI or XDF engine. It is understood that this is only one exemplary embodiment of the present invention and that the installation of different gas-consuming appliances can be provided, without departing from the context of the present invention.

According to the invention, the at least one gas-consuming appliance advantageously makes it possible to consume, at least in part, the gas present in the gaseous state in the headspace of the tank, and thus to prevent this gas from accumulating in the tank, which would lead to an increase in the pressure experienced by the tank, which could, in the long term, damage this tank.

According to the invention, the first compression member and the second compression member are interchangeable for supplying the at least one gas-consuming appliance. In other words, both the first compression member and the second compression member are designed to compress the gas in a gaseous state to similar pressures compatible with the needs of the at least one gas-consuming appliance. In this way, if one of the two compression members fails, the other one can take over and thus ensure a continuous supply of the at least one gas-consuming appliance while maintaining an acceptable pressure in the tank, that is to say a pressure which does not risk damaging this tank, at a lower cost.

Thus, the first compression member and the second compression member are both configured to compress the gas from the supply line from a pressure lower than a pressure of the gas present in the headspace of the tank to a pressure higher than or equal to this pressure of the gas in the headspace of the tank. Each of the compression members is thus able to suck in within the supply line when the latter is under vacuum, that is to say subjected to a pressure lower than the pressure of the gas present in the headspace of the tank, thanks to an expansion operated upstream of this supply line. According to an exemplary application of the invention, the pressure of the gas in the headspace of the tank is equal to, or substantially equal to 1.1 bar.

According to a feature of the present invention, the system comprises at least one heat exchanger configured to implement a heat exchange between the gas flowing in the supply line and gas taken in a liquid state from the tank. According to one embodiment of the present invention, the heat exchanger can for example be equipped with at least one first pass configured to be fed with the gas taken in the liquid state from the tank of the ship and at least one second pass configured to be fed with the gas subjected to a pressure lower than the pressure of the gas in a headspace of the tank. In other words, according to this embodiment, the second pass of the heat exchanger participates in forming the supply line.

The system according to this embodiment of the present invention comprises at least one first pump configured to supply the first pass of the heat exchanger, one second pump configured to supply the second pass of the heat exchanger, at least one expansion means being arranged in the supply line between the second pump and the second pass of the heat exchanger.

According to another embodiment of the present invention, the heat exchanger is equipped with a single pass which participates in forming the supply line and this heat exchanger is arranged in the tank, that is to say in contact with the liquid gas contained in this tank. According to this other embodiment of the present invention, a heat exchange therefore takes place between the gas subjected to a pressure lower than the pressure of the gas in the headspace of the tank which circulates in the first pass of the heat exchanger and the gas present in the liquid state in the tank with which the heat exchanger is in contact.

According to an operating mode of the system according to the invention, the first compression member and the second compression member suck in the gas taken from the headspace of the tank. According to this operating mode, the first compression member and the second compression member are configured to compress the gas to the pressure compatible with the needs of the at least one gas-consuming appliance. Alternatively, an expansion device can be arranged downstream of the first compression member and the second compression member, said expansion device being configured to reduce the pressure of the gas compressed by the first and/or second compression member to the pressure compatible with the needs of the at least one gas-consuming appliance. In other words, according to this alternative, the gas is compressed to a pressure higher than the pressure compatible with the needs of the at least one gas-consuming appliance, and then the gas undergoes an expansion, that is to say a decrease in its pressure to the pressure compatible with the needs of the at least one gas-consuming appliance.

According to a feature of the present invention, the supply system comprises as a compression member only the first compression member and the second compression member.

The supply system according to the invention can also comprise at least one system for reliquefying the gas compressed by the first compression member and/or by the second compression member. Such a reliquefaction system advantageously makes it possible to recycle the gas in the gaseous state that is not consumed by the at least one gas-consuming appliance by condensing it and then returning it to the tank.

According to one embodiment of the present invention, the reliquefaction system comprises at least one first heat exchanger equipped with at least one first pass configured to be passed through by gas compressed by the first compression member and/or by the second compression member and with at least one second pass configured to be passed through by gas taken in the gaseous state from the headspace of the tank. In other words, it is understood that the first heat exchanger of this reliquefaction system is configured to operate a heat exchange between the gas compressed by the first compression member and/or by the second compression member and the gas taken in the gaseous state from the headspace of the tank. For example, the reliquefaction system can also include at least one second heat exchanger configured to operate a heat exchange between the compressed gas that leaves the first heat exchanger and gas taken from the tank in the liquid state. In other words, this second heat exchanger comprises at least one first pass configured to be fed by the compressed gas that leaves the first heat exchanger and at least one second pass configured to be fed by the gas taken from the tank in the liquid state.

According to a feature of this embodiment of the present invention, at least one first conduit is arranged between the first pump and the first pass of the heat exchanger and at least one additional conduit is arranged between the first conduit and the second heat exchanger, at least one first control valve being arranged on this additional conduit. In other words, it is understood that the first pump is configured to supply, at least, the first pass of the heat exchanger and the second heat exchanger of the reliquefaction system.

The first control valve arranged on the additional conduit, that is to say upstream of the second heat exchanger with respect to a direction of gas flow in this additional conduit, is configured to assume an open position in which it allows the flow of liquid gas in the additional conduit and a closed position in which it prevents the flow of gas in this additional conduit. It is understood that this is only an exemplary embodiment and that it may be provided that the second pump supplies only the first pass of the heat exchanger and that a third pump can be provided to supply the second heat exchanger, without departing from the context of the present invention.

Alternatively, the reliquefaction system is without the second heat exchanger and the compressed gas that leaves the first heat exchanger is returned directly into the tank, for example via a bubbling device located at the bottom of the tank. According to this alternative, the gas coming from the first heat exchanger is then released in the form of bubbles which condense in contact with the gas present in the liquid state in the tank.

It is understood that these are only exemplary embodiments and that any other reliquefaction system compatible with the invention could be considered.

According to a feature of the present invention, the first compression member is configured to be supplied with gas having a pressure between 0.35 and 0.7 bar and to compress this gas to a pressure between 2 bar and 13 bar, wherein the second compression member is configured to be supplied with gas having a pressure equivalent to 1 bar and to compress it to a pressure between 5 bar and 20 bar.

According to a first exemplary embodiment of the present invention, at least one pipeline is arranged between the headspace of the tank and an intermediate inlet of the first compression member, at least one control member being arranged on this at least one pipeline.

For example, the control device can be an all-or-nothing valve, that is to say a valve configured to assume an open position in which it allows the flow of gas in the pipeline and a closed position in which it blocks the flow of gas in this pipeline.

According to this first exemplary embodiment, the first compression member comprises at least one main inlet through which it is supplied with gas from the supply line and at least the intermediate inlet through which it is supplied with gas taken in the gaseous state from the headspace of the tank. In other words, it is understood that the first compression member is designed to be supplied, alternatively or simultaneously, with evaporated gas and with gas taken directly in the gaseous state from the headspace of the tank.

Thus, according to this first exemplary embodiment, if the second compression member fails, the control member authorizes the passage of gas in the pipeline so that the gas taken in the gaseous state from the headspace of the tank can be compressed by the first compression member in order to be sent to the at least one gas-consuming appliance. According to this first exemplary embodiment, the second compression member is configured to supply the at least one gas-consuming appliance with gas taken in the gaseous state from the headspace of the tank. In other words, regardless of which compression member fails, the supply of the at least one gas-consuming appliance with gas taken in a gaseous state from the headspace of the tank is ensured, and thus the pressure in the tank is maintained at an acceptable value for this tank.

According to a second exemplary embodiment of the present invention, the first compression member and the second compression member are arranged in series with each other. According to this second exemplary embodiment, at least one first conduit is arranged between an outlet of the first compression member and an inlet of the second compression member, at least one pressure control means being arranged on this at least one first conduit. For example, the pressure control means can be an expansion member, that is to say a member configured to reduce a pressure of the gas flowing in this first conduit. Advantageously, this allows the first compression member to compress the gas evaporated by the heat exchanger with a sufficient pressure difference to ensure its correct operation and limit its wear. The gas thus compressed by the first compression member is then expanded by the pressure control means before being compressed by the second compression member to the pressure compatible with the needs of the at least one gas-consuming appliance.

According to this second exemplary embodiment, the first compression member is for example configured to be supplied with gas having a pressure of between 0.35 bar and 0.7 bar and to compress it to a pressure of between 2 bar and 6 bar, and the second compression member is configured to be supplied with gas having a pressure equivalent, or substantially equivalent, to 1 bar and to compress it to a pressure of between 5 bar and 20 bar.

Alternatively, this series of compressions compresses the gas to a pressure higher than the requirements of the at least one gas-consuming appliance and at least one expansion device is arranged between the second compression member and the at least one gas-consuming appliance, this expansion device then being configured to reduce the pressure of the gas compressed by the first compression member and by the second compression member to the pressure compatible with the requirements of the at least one gas-consuming appliance.

According to the second exemplary embodiment of the present invention, at least one second conduit can be arranged between an outlet of the second pass of the first heat exchanger and an inlet of the first compression member, at least one first flow control means being arranged on this at least one second conduit. This first flow control means can, for example, be an all-or-nothing valve, that is to say a valve configured to assume an open position in which it allows a gas flow in the second pipe and at least one closed position in which it prevents this gas flow in the second pipe. Thus, according to this second exemplary embodiment, when the first compression member fails, the gas-consuming appliance is supplied with gas taken in the gaseous state from the headspace of the tank and compressed by the second compression member. When the second compression member fails, the first flow control means can be put in the open position in order to allow the gas taken in the gaseous state from the headspace of the tank to be fed to the first compression member and thus ensure that the gas-consuming appliance is supplied with gas taken in the gaseous state from the headspace of the tank.

Alternatively, the first flow control means can be a pressure control member. According to this alternative, when the second compression member fails, the gas taken in the gaseous state from the headspace of the tank is directed towards the second pipe, along which it is expanded by the first flow control means, that is to say its pressure is reduced, to a pressure equivalent to the pressure of the gas from the supply line, that is to say a pressure of between 0.35 bar and 0.7 bar This alternative thus makes it possible, advantageously, to supply the first compression member, simultaneously, with gas taken in the gaseous state from the headspace of the tank and with gas taken in the liquid state from the tank and evaporated by the supply line.

Thus, the second exemplary embodiment of the present invention makes it possible to ensure an uninterrupted supply of the at least one gas-consuming appliance, at least, with gas taken in the gaseous state from the headspace of the tank, thereby maintaining an acceptable pressure in the tank, that is to say a pressure that is not likely to damage this tank.

According to a feature of the present invention, the supply system comprises at least one means for distributing the gas in the liquid state from the heat exchanger into a bottom of the tank. For example, this distribution means is formed by a ramp equipped with a plurality of orifices. According to this example, the orifices are distributed over the entire longitudinal dimension of the ramp, each of these orifices being designed to allow the ejection of gas in the liquid state from the heat exchanger.

Optionally, an outlet of the second heat exchanger of the reliquefaction system through which gas in the liquid or two-phase state leaves this second heat exchanger can also be connected to this distribution means in order to be returned into the tank. Advantageously, such a ramp makes it possible to distribute the gas in the liquid state coming from the heat exchanger and/or from the second heat exchanger in the bottom of the tank so that it makes it possible to lower the overall temperature of the gas present in the liquid state in this tank, and thus participates in limiting the phenomenon of evaporation which tends to generate the accumulation of gas in the gaseous state in the tank. Alternatively, the distribution means is formed by a simple pipeline.

The present invention also relates to a ship for transporting liquefied gas, comprising at least one tank of a liquefied gas cargo, at least one evaporated-gas-consuming appliance and at least one system for supplying gas to the gas-consuming appliance according to the invention. The expression "a tank of a liquefied gas cargo" means both a tank which serves both for the transport of liquefied gas and as a tank for liquefied gas used as fuel for the supplying the at least one gas-consuming appliance, and a tank which serves solely as a tank for liquefied gas for supplying the at least one gas-consuming appliance.

According to a feature of the present invention, the ship comprises at least one first gas-consuming appliance configured to be supplied with gas compressed at a first pressure, and at least one second gas-consuming appliance configured to be supplied with gas compressed at a second pressure, the first gas-consuming appliance and the second gas-consuming appliance both being configured to be supplied by the at least one supply system according to the invention, and the first supply pressure of the first gas-consuming appliance being higher than the second supply pressure of the second gas-consuming appliance.

The present invention also relates to a system for loading or unloading a gas in a liquid state which combines at least one onshore means and at least one ship for transporting gas in a liquid state according to the invention.

Lastly, the invention relates to a method for loading or unloading a gas in a liquid state from a gas transport ship according to the invention.

Other features, details and advantages of the invention will become clearer upon reading the following description on the one hand, and an exemplary embodiment given by way of on-limiting indication with reference to the accompanying drawings on the other hand, in which.

In the following description, the terms “upstream” and “downstream” are used to refer to the direction of flow of a gas in a liquid, gaseous or two-phase state through the element in question. In FIGS. 2 to 6 and 8 to 14, the solid lines represent circuit portions in which gas in a liquid, gaseous or two-phase state circulates, whereas the dotted lines represent circuit portions in which gas does not circulate. Lastly, the space of the tank 200 occupied by the gas in a gaseous state is referred to as the “headspace 201 of the tank 200” and the terms “system 100 for supplying gas to at least one gas-consuming appliance 300”, “supply system 100” and “system 100” will be used synonymously.

The description given below relates to two particular exemplary applications of the present invention in which the tank 200 of a ship contains natural gas, that is to say a gas predominantly composed of methane. It is understood that this is just one exemplary application and that the system 100 for supplying gas to at least one gas-consuming appliance 300 according to the invention can be used with other types of gas, such as hydrocarbon or hydrogen gases. According to the invention, the tank 200 of this ship can serve exclusively as a reservoir containing the gas for supplying gas to the at least one gas-consuming appliance 300, or, alternatively, this tank 200 can serve both as a gas reservoir and as a transport tank for this gas.

Figure 1:
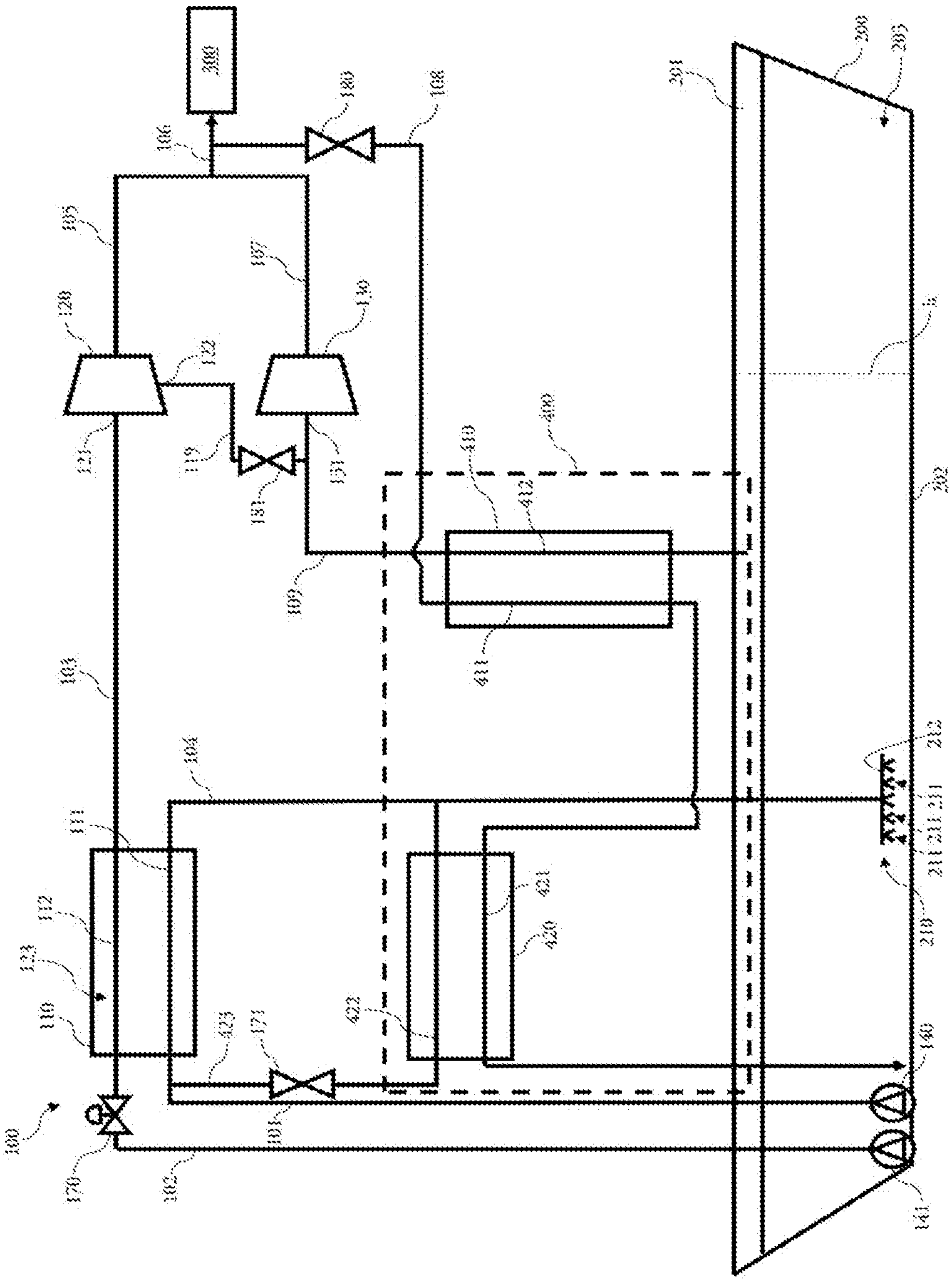
FIG. 1 illustrates, schematically, a system for supplying gas to at least one gas-consuming appliance according to a first exemplary embodiment of the present invention.
Figure 7:
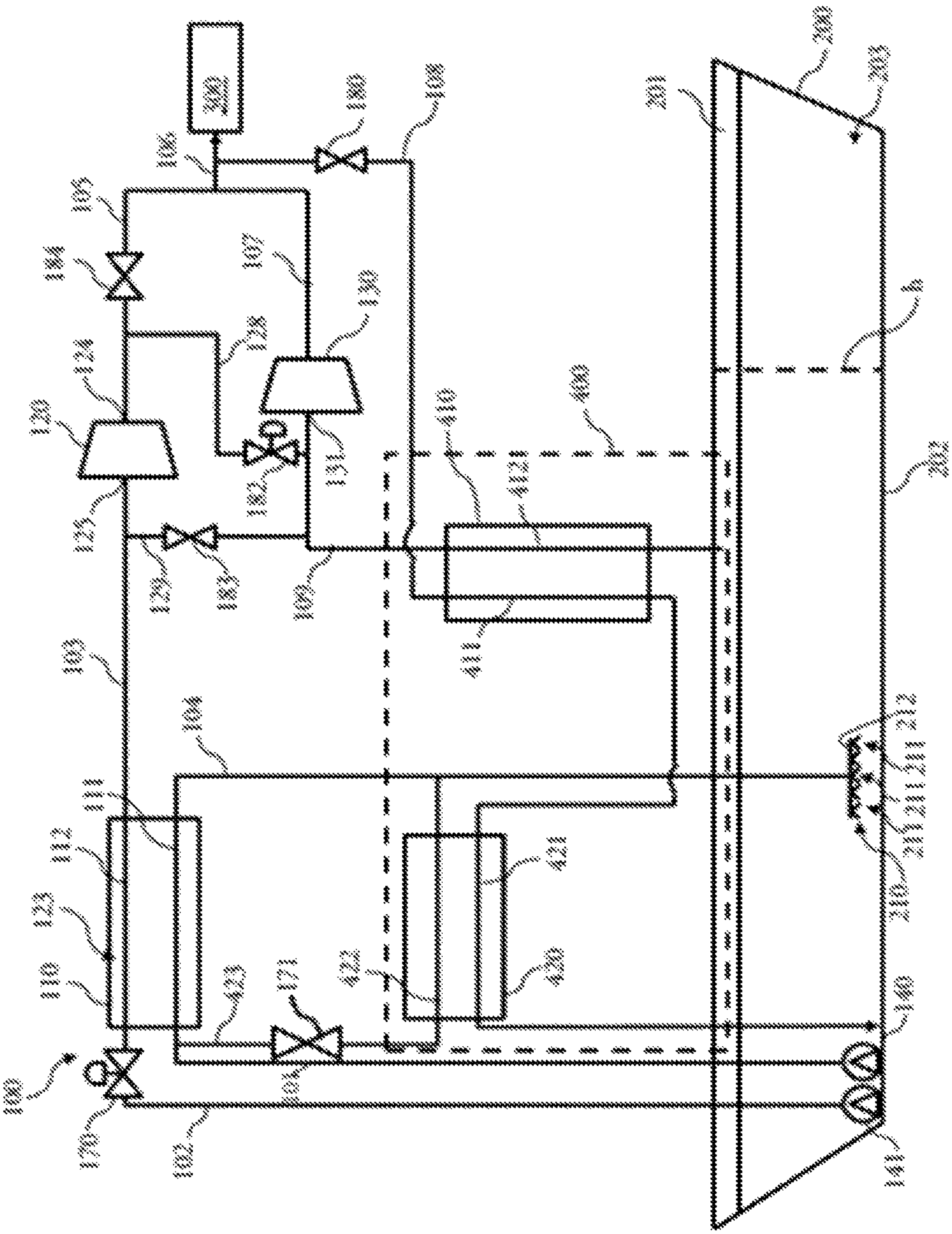
FIG. 7 illustrates, schematically, the system for supplying gas to at least one gas-consuming appliance according to a second exemplary embodiment of the present invention.

FIGS. 1 and 7 thus first schematically illustrate the gas supply system 100, when stopped, according to, respectively, the first exemplary embodiment of the present invention and the second exemplary embodiment of the present invention. The system 100 comprises at least one heat exchanger 110, at least one first compression member 120, at least one second compression member 130, and at least one gas-consuming appliance 300. According to any one of the first and second exemplary embodiments of the present invention illustrated here, the system 100 further comprises, a gas reliquefaction system 400.

Advantageously, according to both exemplary embodiments of the invention, the supply system 100 comprises only two compression members as compression means for supplying the gas-consuming appliance 300, for example an engine. This is particularly advantageous in view of the very high costs of these components and the requirement to constantly have a backup means for supplying the gas-consuming appliance 300.

The reliquefaction system 400 according to the invention includes at least one first heat exchanger 410 and/or at least one second heat exchanger 420 arranged in series for at least one flow passing therethrough. The first heat exchanger 410 comprises at least one first pass 411 configured to be passed through by gas compressed by the first compression member 120 and/or by the second compression member 130, and at least one second pass 412 configured to be passed through by gas taken in the gaseous state from the headspace 201 of the tank 200. The second heat exchanger 420, for its part, has at least one first pass 421 configured to be passed through by the compressed gas leaving the first pass 411 of the first heat exchanger 410 and at least one second pass 422 configured to be passed through by gas taken in the liquid state from the tank 200. As described below, this gas taken in the liquid state from the tank 200 can be expanded, that is to say can undergo a decrease in its pressure, before being sent to the second pass 422 of the second heat exchanger 420.

The first heat exchanger 410 is thus configured to operate a heat exchange between compressed gas and gas taken, in the gaseous state, from the headspace 201 of the tank 200. As a result, the compressed gas leaves the first pass 411 of the first heat exchanger 410 in the gaseous or two-phase state, that is to say a mixture of gas and liquid, and the gas taken in the gaseous state from the headspace 201 of the tank 200 is warmed as it passes through the second pass 412 of the first heat exchanger 410. The gas heated as it passes through the first heat exchanger 410 is then sent to one of the compression members 120, 130 in order to be compressed and then sent, at least in part, to the at least one gas-consuming appliance 300.

The second heat exchanger 420 is configured, for its part, to carry out a heat exchange between the two-phase gas coming from the first pass 411 of the first heat exchanger 410 and the gas taken in the liquid state from the tank 200. The two-phase gas is condensed as it passes through the second heat exchanger 420 in order to be then returned to a bottom 203 of the tank 200 and the gas taken in the liquid state from the tank 200 is in turn heated as it passes through the second heat exchanger 420.

According to an example not shown here, the reliquefaction system can be without the second heat exchanger. According to this example, the first pass of the first heat exchanger is connected, for example, to a bubbling device arranged in the bottom of the tank. The gas in a two-phase state coming from the first heat exchanger is then ejected into the bottom of the tank in the form of bubbles which condense in contact with the gas in a liquid state present in the bottom of this tank.

The expression "bottom 203 of the tank 200" means a portion of the tank 200 which extends between a bottom wall 202 of the tank 200 and a plane parallel to this bottom wall 202 and arranged, at most, at 20% of the total height h of the tank, this total height h being measured along a straight line perpendicular to the bottom wall 202 of the tank 200 between two opposite ends of this tank 200, along the length of this straight line.

Advantageously, the plane parallel to the bottom wall 202 which participates in delimiting the "bottom of the tank" can be arranged at 10% of the total height h of the tank.

It is understood that these are only exemplary embodiments of the present invention and that any other reliquefaction system compatible with the invention could be used without departing from the context of the present invention. For example, a reliquefaction system can be provided that includes a separate refrigerant fluid circuit.

According to the invention, the supply system 100 comprises at least one supply line 123 for supplying the at least one gas-consuming appliance 300, this supply line being configured to be passed through by gas taken in the liquid state from the tank 200 and subjected to a pressure lower than a pressure of the gas in a headspace 201 of the tank 200. According to an exemplary application of the present invention, the gas in the headspace 201 of the tank 200 has a pressure equivalent, or substantially equivalent, to atmospheric pressure, that is to say a pressure in the order of 1 bar.

The supply system 100 according to the invention comprises at least one pump 141 arranged in the bottom 203 of the tank 200 and at least one expansion means 170 arranged between this pump 141 and the supply line 123, the pump 141 and the expansion means 170 being configured to ensure the supply of the supply line 123. The following description provides an exemplary embodiment of said supply line 123, but it is understood that said supply line 123 could take a different form without departing from the context of the present invention.

Thus, at least one first conduit 101 is arranged between a first pump 140 and a first pass 111 of the heat exchanger 110. At least one second conduit 102 is arranged between a second pump 141 and a second pass 112 of the heat exchanger 110. Both the first pump 140 and the second pump 141 are arranged at the bottom 203 of the tank 200, so as to take the gas in a liquid state and send it to the first and second passes 111, 112 of the heat exchanger 110. A third conduit 103 extends between the second pass 112 of the heat exchanger 110 and the first compression member 120, this second pass 112 and the third conduit 103 forming, at least partially, the supply line 123 of the aforementioned at least one gas-consuming appliance 300. More particularly, this third conduit 103 extends between the second pass 112 of the heat exchanger 110 and a main inlet 121 of the first compression member 120.

According to the invention, at least one expansion means 170 is arranged on the second conduit 102, that is to say between the second pump 141 and the second pass 112 of the heat exchanger 110. This expansion means 170 is thus configured to expand the gas in the liquid state conveyed by the second pump 141, that is to say to decrease the pressure of this gas in the liquid state, before the latter joins the second pass 112 of the heat exchanger 110. In other words, the expansion means 170 arranged upstream of the heat exchanger 110 makes it possible to create a pressure difference between the gas flowing in the first pass 111 and the gas flowing in the second pass 112 of this heat exchanger 110. The gas in the liquid state circulating in the first pass 111 of the heat exchanger 110 thus has a pressure identical, or substantially identical, to the pressure of the gas contained in the liquid state in the tank 200 and the gas circulating in the second pass 112 of the heat exchanger 110 has a pressure lower than the pressure of the gas contained in the liquid state in the tank 200. The gas flowing in the second pass 112 thus vaporizes as it passes through the second pass 112 of the heat exchanger 110.

As a result, a heat exchange takes place in this heat exchanger 110 so that the gas in a liquid state is cooled as it passes through the first pass 111 of the heat exchanger 110 and the gas in an expanded liquid state is evaporated as it passes through the second pass 112 of the heat exchanger 110.

According to an exemplary embodiment of the invention not illustrated here, the heat exchanger could comprise a single first pass fed by the gas subjected to a pressure lower than the pressure of the gas in the headspace of the tank and could be immersed in contact with the gas contained in the liquid state in the tank. According to this exemplary embodiment, a heat exchange similar to the one described above takes place between the expanded gas circulating in the heat exchanger and the liquid gas with which this heat exchanger is arranged in contact.

An additional conduit 423 is arranged between the first conduit 101 and the second pass 422 of the second heat exchanger 420, at least one first control valve 171 being arranged on this additional conduit 423. This first control valve 171 is configured to assume an open position in which it allows the circulation of liquid gas in the additional conduit 423 and a closed position in which it prohibits the circulation of gas in this additional conduit 423.

A fourth conduit 104 is arranged between the first pass 111 of the heat exchanger 110 and the bottom 203 of the tank 200. As illustrated, this fourth conduit 104 is more particularly arranged between the first pass 111 of the heat exchanger 110 and a means 210 for distributing the gas in the liquid state in the bottom 203 of the tank 200. According to the examples illustrated here, this distribution means 210 is formed by a ramp 212 arranged at the bottom 203 of the tank 200. As will be further detailed below, this ramp 212 advantageously allows the gas cooled as it passes through the heat exchanger 110 to be distributed in the bottom 203 of the tank 200. According to an exemplary embodiment not illustrated here, this distribution means 210 can be formed simply by the fourth conduit 104, which then opens directly into the bottom 203 of the tank 200.

A fifth conduit 105 extends between the first compression member 120 and a sixth conduit 106 connected, for its part, to the at least one gas-consuming appliance 300.

In other words, the gas taken in the liquid state from the tank 200 by the second pump 141 and evaporated as it passes through the second pass 112 of the heat exchanger 110 is intended to supply the at least one gas-consuming appliance 300.

It is also noted that a seventh conduit 107 is arranged between the second compression member 130 and the sixth conduit 106. This seventh conduit 107 makes it possible, in particular, to supply the at least one gas-consuming appliance 300 with gas taken in the gaseous state from the headspace 201 of the tank 200 and compressed by the second compression member 130.

In other words, it is understood that both the first compression member 120 and the second compression member 130 are designed to independently supply the at least one gas-consuming appliance 300. Thus, the first compression member 120 and the second compression member 130 are both configured to compress the gas to a pressure compatible with the needs of the gas-consuming appliance 300, that is to say an absolute pressure between 5 bar and 20 bar or a pressure higher than 150 bar depending on the type of gas-consuming appliance 300 to be supplied. The first compression member 120 is further designed to compress the gas from the second pass 112 of the heat exchanger 110 from a pressure lower than a pressure of the gas present in the gaseous state in the headspace 201 of the tank 200, to a pressure higher than or equal to this pressure of the gas present in the gaseous state in the headspace 201 of the tank 200. For example, the first compression member 120 is designed to compress the gas from the second pass 112 of the heat exchanger 110 from an absolute pressure between 0.35 bar and 0.7 bar to the pressure compatible with the needs of the at least one gas-consuming appliance 300, higher than 1.1 bar, for example a pressure between 5 bar and 20 bar.

The same applies to the second compression member 130, which is designed to compress the gas from the second pass 112 of the heat exchanger 110 from a pressure lower than the pressure of the gas present in the gaseous state in the headspace 201 of the tank 200 to a pressure greater than or equal to this pressure of the gas present in the gaseous state in the headspace 201 of the tank 200. For example, the second compression member 130 is designed to compress the gas from the second pass 112 of the heat exchanger 110 from an absolute pressure between 0.35 bar and 0.7 bar to the pressure compatible with the needs of the at least one gas-consuming appliance 300, that is to say a pressure higher than 1.1 bar, for example a pressure between 5 bar and 20 bar.

According to an exemplary embodiment not illustrated here, the first compression member and the second compression member are configured to compress the gas that supplies them respectively to a pressure higher than the pressure compatible with the needs of the at least one gas-consuming appliance. According to this exemplary embodiment, at least one expansion device is arranged downstream of the first compression member and the second compression member and upstream of the gas-consuming appliance, this expansion device being configured to reduce the pressure of the gas compressed by the first compression member and/or by the second compression member to the pressure compatible with the needs of the gas-consuming appliance. For example, this expansion device can be arranged on the sixth conduit.

An eighth conduit 108 extends between the sixth conduit 106 and the reliquefaction system 400 described above, that is to say between the sixth conduit 106 and the first pass 411 of the first heat exchanger 410 of this reliquefaction system 400. As will be described in greater detail below, at least one second control valve 180 is arranged on this eighth conduit 108 in order to allow or prohibit the passage of compressed gas flowing through the sixth conduit 106. For example, the second control valve 180 can be an "all-or-nothing" valve, that is to say a valve configured to assume an open position in which it allows the passage of compressed gas through the eighth conduit 108 and a closed position in which it prohibits the flow of gas through this eighth conduit 108.

Lastly, a ninth conduit 109 is arranged between the second pass 412 of the first heat exchanger 410 and one or other of the compression members 120, 130. In other words, this ninth conduit 109 ensures the supply of the first compression member and/or the second compression member 130 with gas taken in the gaseous state from the headspace 201 of the tank 200 and intended to supply the at least one gas-consuming appliance 300.

According to the first exemplary embodiment, illustrated for example in FIG. 1, a pipeline 119 is also arranged between the ninth conduit 109 and an intermediate inlet 122 of the first compression member 120, at least one control member 181 being arranged on this pipeline 119. It is noted that the intermediate inlet 122 of the first compression member 120 through which this first compression member 120 is supplied with gas taken in the gaseous state from the headspace 201 of the tank 200 is separate from the main inlet 121 of this first compression member 120 through which the latter is supplied with gas evaporated as it passes through the heat exchanger 110. These two separate inlets allow the first compression unit 120 to be supplied at two different compression levels. Indeed, as previously mentioned, the evaporated gas leaves the heat exchanger 110 at a lower pressure than the pressure of the gas present in the gaseous state in the headspace 201 of the tank 200. For example, the evaporated gas leaves the heat exchanger 110 at an absolute pressure of less than 1 bar, between 0.35 bar and 0.7 bar, whereas the gas taken in the gaseous state from the headspace 201 of the tank 200 has an absolute pressure of about 1 bar. The intermediate inlet 122 thus allows the gas taken in the gaseous state from the headspace 201 of the tank 200 to join the compressed flow after intermediate compression of the flow from the heat exchanger 110. This is particularly the case when the first compression member 120 and/or the second compression member 130 are multi-stage members.

According to the second exemplary embodiment illustrated in FIG. 7, at least one first conduit 128 is arranged between the fifth conduit 105 and the ninth conduit 109, at least one pressure control means 182 being arranged on this first conduit 128. Thus, this first conduit 128 extends between an outlet 124 of the first compression member 120 and an inlet 131 of the second compression member 130 and allows a supply of the second compression member 130 with gas evaporated by the heat exchanger 110 and compressed by the first compression member 120. The pressure control means 182 can, for example, be an expansion member configured to reduce the pressure of the gas compressed by the first compression member 120 before this gas is fed to the second compression member 130. Furthermore, this pressure control means 182 is configured to assume a closed position in which it prohibits the circulation of gas in the first conduit 128. Advantageously, this pressure control means 182 makes it possible to have a pressure difference between the inlet 125 and the outlet 124 of the first compression member 120 sufficient to allow an optimal operation of this first compression member 120. In other words, the gas is compressed to a first pressure by the first compression member 120, then expanded by the pressure control means 182 before being compressed again by the second compression member 130 to the pressure compatible with the needs of the gas-consuming appliance 300. For example, the first compression member 120 is configured to compress the gas from a pressure between 0.35 bar and 0.7 bar to a pressure between 2 bar and 6 bar. The gas is then expanded to a pressure of approximately 1 bar by the pressure control means 182, and then the second compression member 130 is configured to compress this gas from its pressure of 1 bar to a pressure of between 5 bar and 20 bar, that is to say the pressure compatible with the needs of the gas-consuming appliance 300.

At least one second conduit 129 is arranged between the ninth conduit 109 and an inlet 125 of the first compression member 120, at least one first flow control means 183 being arranged on this second conduit 129. According to this second exemplary embodiment of the present invention, a second flow control means 184 is further arranged on the fifth conduit 105, that is to say between the first compression member 120 and the gas-consuming appliance 300. For example, the first flow control means 183 and the second flow control means 184 can be "all-or-nothing" valves, that is to say valves configured to assume an open position in which they allow gas to pass through the conduit on which they are arranged or a closed position in which they prevent gas from passing through this conduit. Alternatively, and as will be more fully detailed below with reference to FIG. 13, the first flow control means 183 can be a pressure control member, that is to say a member configured to reduce a pressure of the gas passing through it. According to yet another alternative, the first flow control means 183 can be an all-or-nothing valve and a branch carrying a pressure control member can be arranged in parallel with this second conduit 129 carrying the first flow control means, the gas being adapted to flow through the second conduit 129 or the branch parallel to this second conduit 129 depending on the operating mode of the system 100.

Lastly, the second exemplary embodiment of the present invention differs from the first exemplary embodiment in that two gas recirculation lines—not illustrated here—are provided in parallel, respectively, to the first compression member 120 and to the second compression member 130, each of these recirculation lines carrying at least one pressure control means. Advantageously, these pressure control means allow the first compression member 120 and the second compression member 130 to compress the gas supplied to them to different pressures depending, for example, on the needs of the at least one gas-consuming appliance 300.

For example, the at least one gas-consuming appliance 300 can be a DFDE (Dual Fuel Diesel Electric) generator, that is to say a gas-consuming appliance configured to provide electrical power to the ship. The gas-consuming appliance 300 can also be at least one propulsion engine of the ship, such as an ME-GI or XDF engine. It is understood that this is just one exemplary embodiment of the present invention and that different gas-consuming appliances can be provided without departing from the context of the present invention.

With reference to the first exemplary embodiment of the present invention, three modes of operation will now be described: a first operating mode in which only a portion of the gas present in the gaseous state in the headspace 201 of the tank 200 is consumed by the at least one gas-consuming appliance 300 and in which another portion of this gas present in the gaseous state in the headspace 201 of the tank 200 is reliquefied by the reliquefaction system 400 before being returned to the bottom of the tank 203, and a second and third operating mode in which the quantity of gas present in the gaseous state in the headspace 201 of the tank 200 is insufficient to supply the at least one gas-consuming appliance 300 and in which gas is taken in the liquid state from the tank 200 and evaporated by the heat exchanger 110 in order to make up for this insufficiency. As described below, the second operating mode differs from the third operating mode in that in the second operating mode the at least one gas-consuming appliance 300 is supplied with gas compressed by the first compression member 120 and with gas compressed by the second compression member 130, whereas in the third operating mode the at least one gas-consuming appliance 300 is supplied with gas compressed only by the first compression member.

Figure 2:
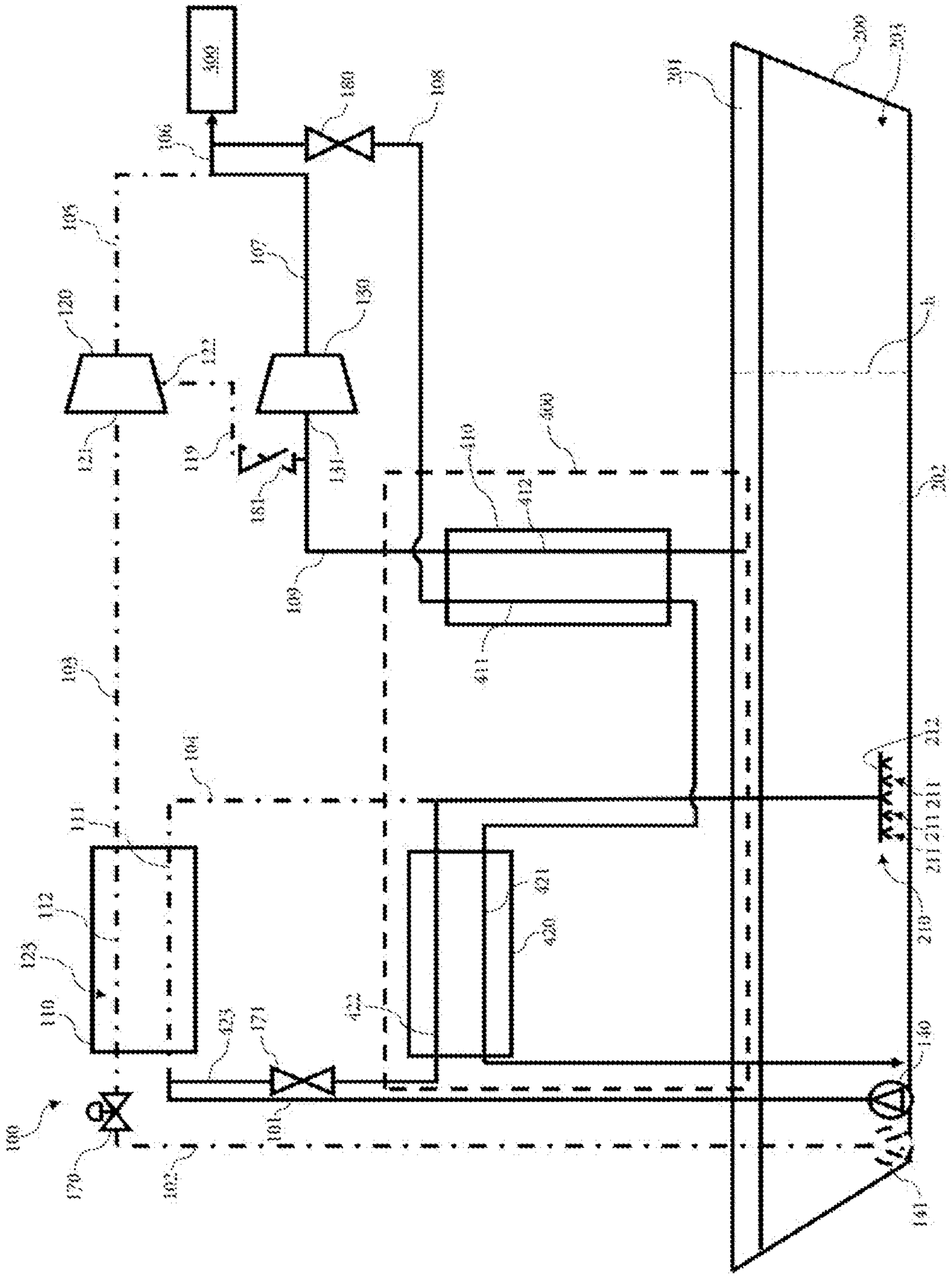
FIG. 2 illustrates, schematically, a first operating mode of the gas supply system according to the first exemplary embodiment shown in FIG. 1.
Figure 3:
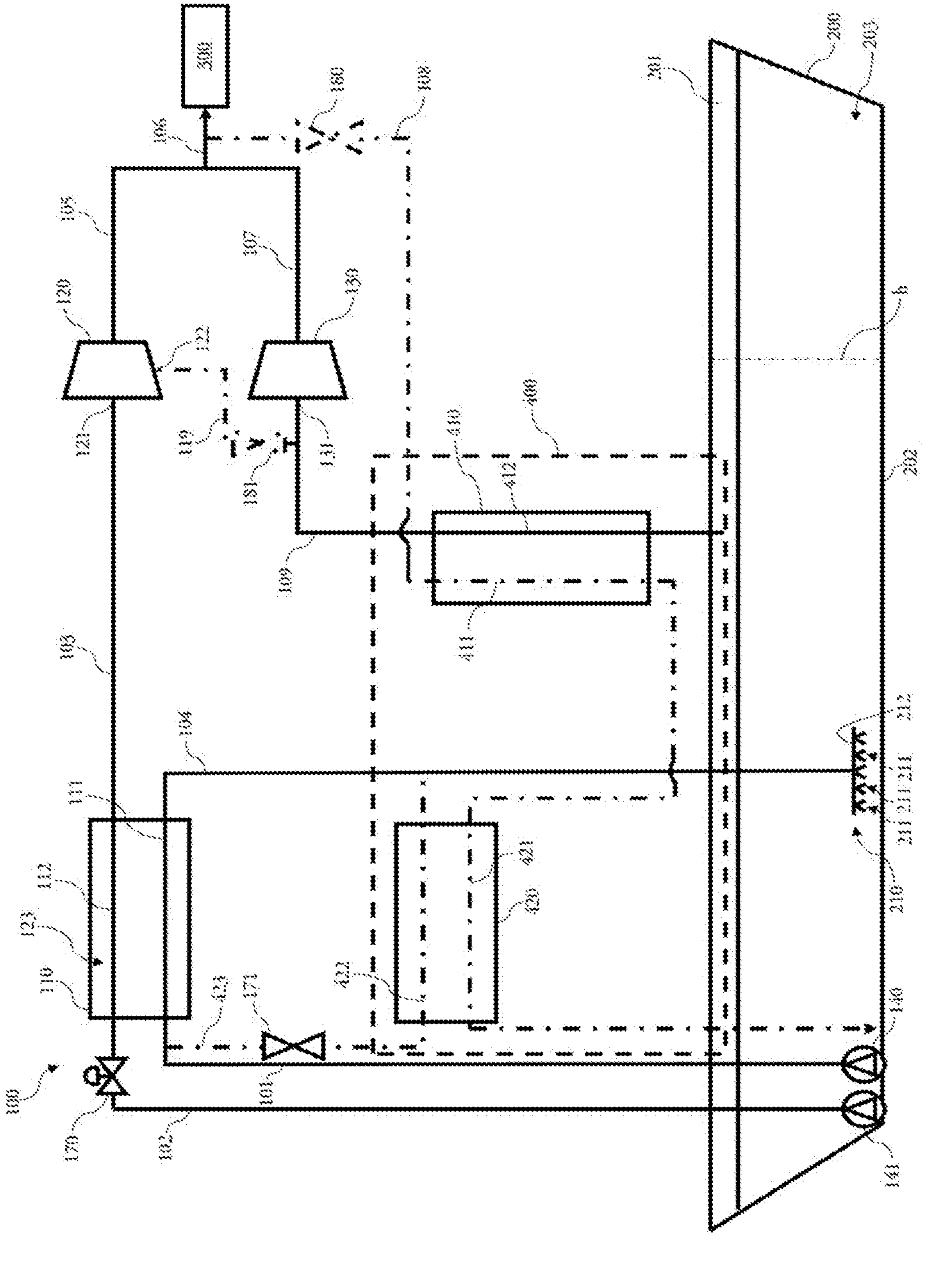
FIG. 3 illustrates, schematically, a second operating mode of the gas supply system according to the first exemplary embodiment shown in FIG. 1.
Figure 4:
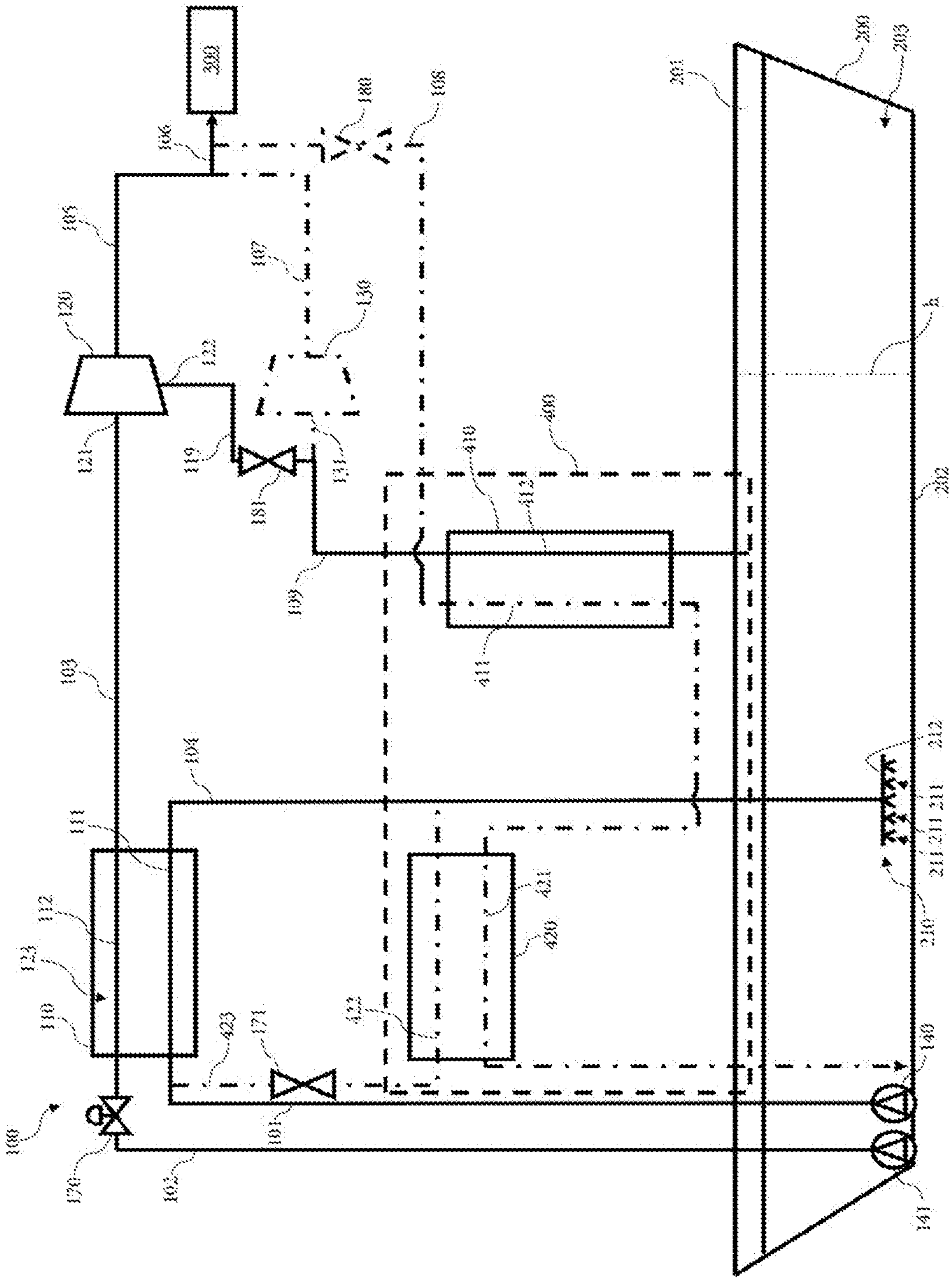
FIG. 4 illustrates, schematically, a third operating mode of the gas supply system according to the first exemplary embodiment shown in FIG. 1.

FIG. 2 thus illustrates the first operating mode of the system 100 according to the first exemplary embodiment of the present invention. As shown, the at least one gas-consuming appliance 300 is supplied with gas taken in the gaseous state from the headspace 201 of the tank 200, which passes through the first heat exchanger 410 before being compressed by the second compression member 130 to a pressure compatible with the needs of this at least one gas-consuming appliance 300. Part of the gas thus compressed is fed to the gas-consuming appliance 300, whereas another part of this compressed gas is sent to the reliquefaction system 400. This situation occurs, for example, when the gas-consuming appliance 300 consumes less than the quantity of gas that evaporates in the tank 200.

The part of the compressed gas sent to the reliquefaction system 400 is thus first partially cooled by a heat exchange with gas taken in the gaseous state from the headspace 201 of the tank 200, within the first heat exchanger 410, then this gas which leaves the first heat exchanger 410 in the gaseous or two-phase state completes its condensation by a heat exchange with gas taken in the liquid state from the tank 200 and expanded by the first control valve 171, this heat exchange being carried out within the second heat exchanger 420. The gas thus condensed at the outlet of the second heat exchanger 420 is returned to the bottom of the tank through the fourth conduit 104. As previously mentioned, this fourth conduit 104 is connected to a ramp 212 which has a plurality of orifices 211 configured to allow the release and distribution over a large surface of the gas in the liquid state which reaches it.

Furthermore, the heat exchanger 110 is not powered, that is to say the second pump 141 is stopped. Indeed, as previously described, this heat exchanger 110 makes it possible to evaporate gas taken in the liquid state from the tank 200 in order to supply the gas-consuming appliance 300. When the gas present in the gaseous state in the headspace 201 of the tank 200 is sufficient to supply this gas-consuming appliance 300, this heat exchanger 110 does not need to operate and the second pump 141 can therefore be stopped.

On the other hand, when the quantity of gas present in the gaseous state in the headspace 201 of the tank 200 is insufficient to supply the gas-consuming appliance 300, then the second pump 141 is put into operation so as to supply the heat exchanger 110. This is, for example, illustrated in FIG. 3, which represents the second operating mode of the system 100 according to the first exemplary embodiment of the present invention. Thus, according to this second operating mode, the first pump 140 and the second pump 141 are both turned on to supply the heat exchanger 110 and thus supply the gas-consuming appliance 300 with evaporated gas, and the reliquefaction system 400 is in turn turned off, that is to say the second control valve 180 is in its closed position and the first control valve 171 prevents the circulation of gas in the additional pipe 423, all of the gas present in the gaseous state in the headspace 201 of the tank 200 and compressed by the second compression member 130 being consumed by the gas-consuming appliance 300. Thus, according to this second operating mode, the at least one gas-consuming appliance 300 is supplied with gas taken in the liquid state from the tank 200, evaporated in the heat exchanger 110 and compressed by the first compression member 120, and also with gas taken in the gaseous state from the headspace 201 of the tank 200 and compressed by the second compression member 130.

As previously mentioned, the supply system 100 according to the invention also makes it possible, in an advantageous manner, to use only the first compression member 120 to supply the at least one gas-consuming appliance 300 with gas taken in the gaseous state from the headspace 201 of the tank 200 and with gas taken in the liquid and evaporated state. Such an operating mode corresponds to the third operating mode illustrated in FIG. 4.

This third operating mode differs from the second operating mode in particular in that the second compression member 130 is stopped and the control member 181 is in its open position, thus allowing the circulation of gas in the pipe 119. As described above, the gas evaporated as it passes through the heat exchanger 110 reaches the first compression member 120, in which it is compressed to a pressure compatible with the needs of the gas-consuming appliance 300. The gas taken in the gaseous state from the headspace 201 of the tank 200 passes through the first heat exchanger 410, in which it undergoes no modification of temperature or pressure other than those associated with its intake and with the pressure drops inherent to the transport of this type of fluid, and then flows through the pipe 119, by which it joins the first compression member 120 through its intermediate inlet 122. The first compression member 120 is then configured to compress this gas to the pressure compatible with the needs of the gas-consuming appliance 300.

According to this third operating mode, the first compression member 120 can, for example, be a multi-stage compressor. Thus, the evaporated gas supplying the first compression member 120 through its main inlet 121 is compressed to a pressure equivalent to the pressure of the gas present in the gaseous state in the headspace 201 of the tank 200. The intermediate inlet 122 of the first compression member 120 is then arranged so that the gas taken in the gaseous state from the headspace 201 of the tank 200 mixes with the evaporated gas at a point of the first compression member 120 at which this evaporated gas is already compressed to the pressure of the gas present in the headspace 201 of the tank 200. The first compression member 120 is then designed to compress the gas mixture thus formed to the pressure compatible with the needs of the at least one gas-consuming appliance 300.

Advantageously, this third operating mode also makes it possible to compensate for a possible failure of the second compression member 130, that is to say to maintain a supply to the at least one gas-consuming appliance 300 by gas taken in the gaseous state from the headspace 201 of the tank 200 and by gas taken in the liquid state from the tank 200 and evaporated by the heat exchanger 110.

There is also a fourth operating mode, not shown here, called “equilibrium”, in which the quantity of gas contained in the headspace of the tank in the gaseous state is equivalent, or substantially equivalent, to the requirement of the at least one gas-consuming appliance. According to this fourth operating mode, the first pump and the second pump are thus stopped, and neither the heat exchanger nor the reliquefaction system operates, the gas-consuming appliance then being supplied by the first compression member or by the second compression member, which sucks in the gas in the gaseous state present in the headspace 201 of the tank 200.

Figure 5:
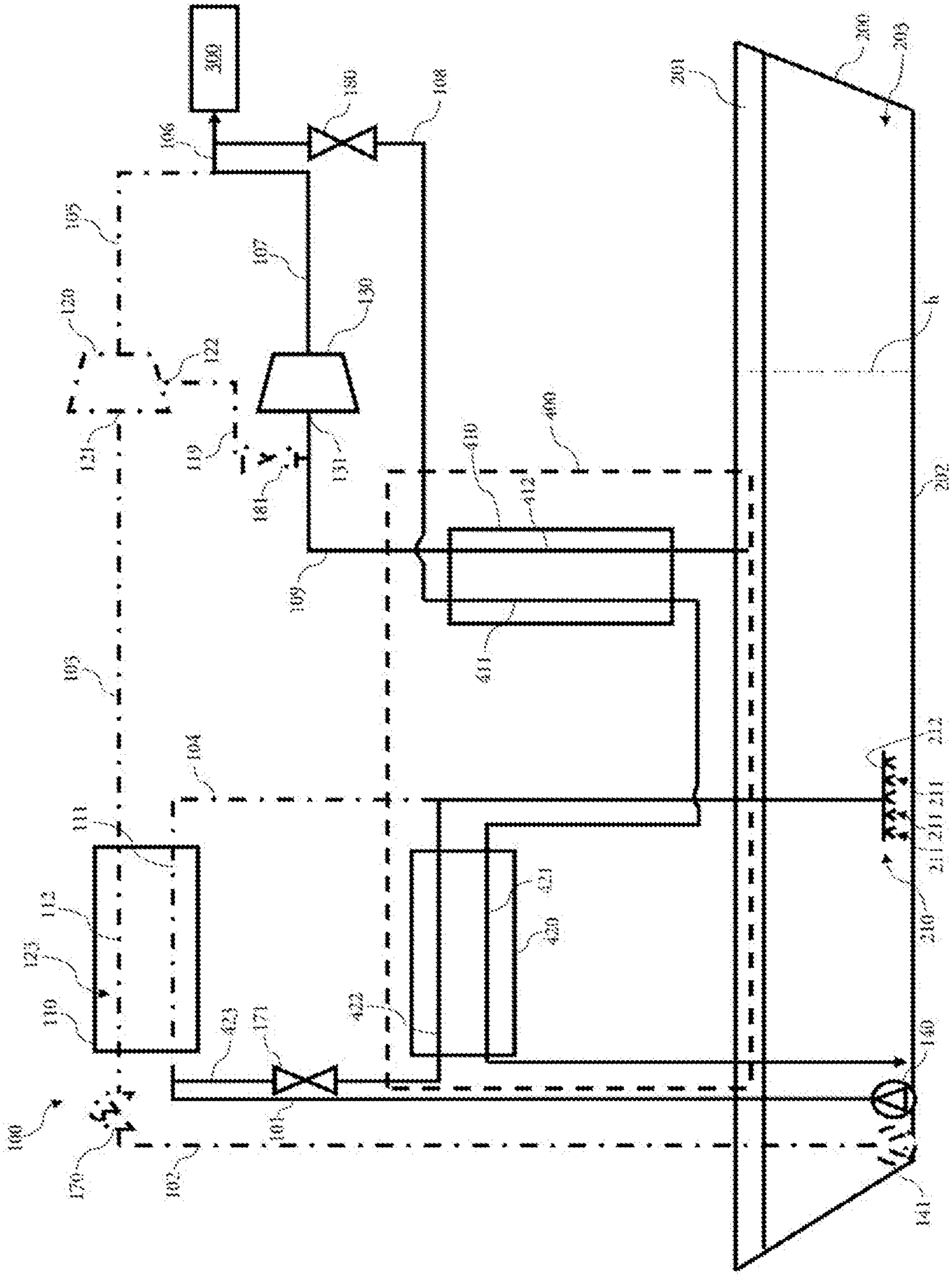
FIG. 5 illustrates, schematically, the gas supply system according to the first exemplary embodiment of the present invention, in which a first compression member fails.

FIG. 5 illustrates the gas supply system 100 according to the first exemplary embodiment of the present invention in which the first compression member 120 fails. It is understood from this FIG. 5 that in the event of failure of the first compression member 120, the supply of the gas-consuming appliance 300 remains ensured by the gas taken in the gaseous state from the headspace 201 of the tank 200, which also allows the pressure in the tank 200 to be maintained at an acceptable value. In this situation, this FIG. 5 illustrates a mode identical to the first operating mode of the system 100 illustrated in FIG. 2.

Figure 6:
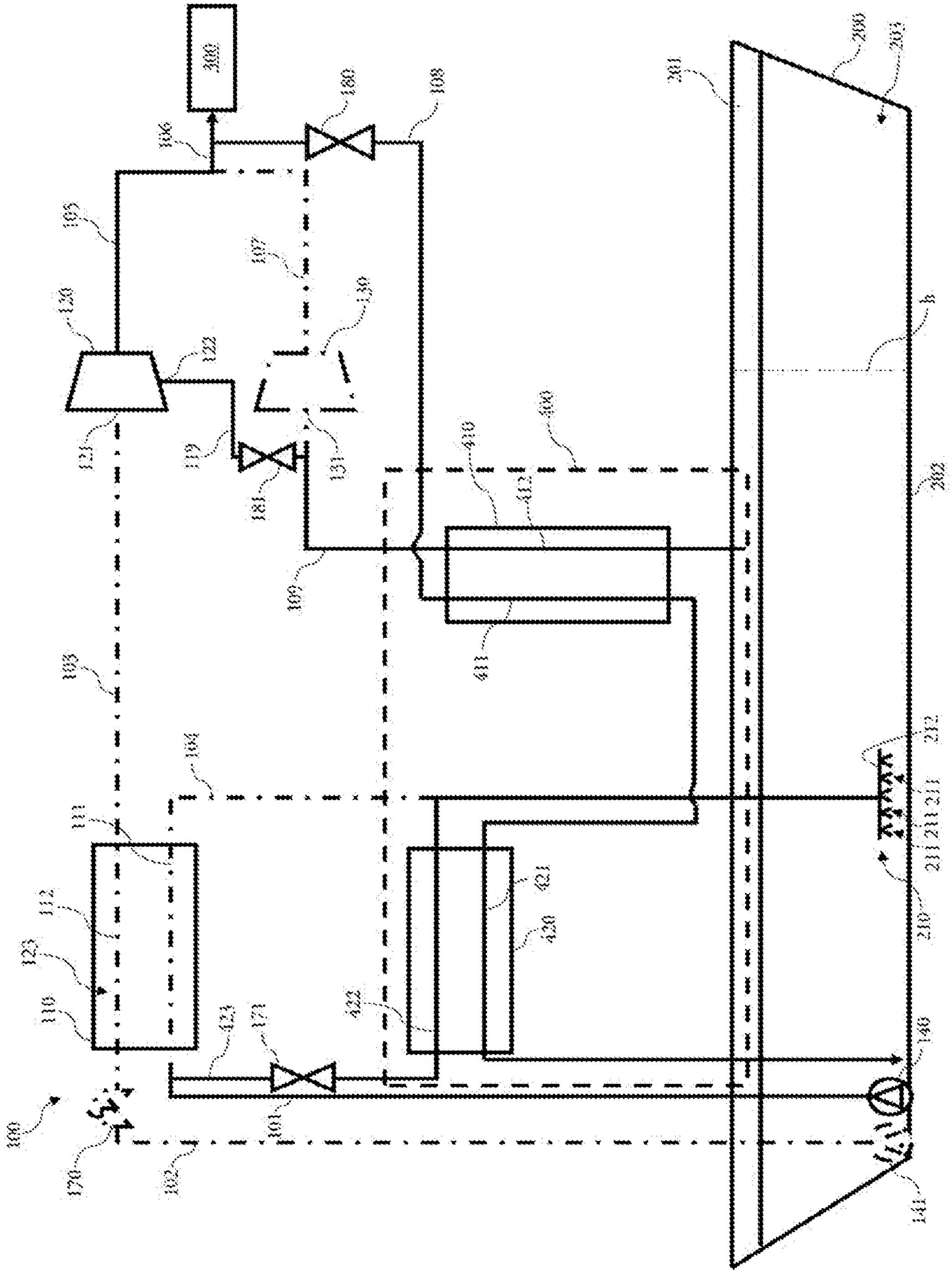
FIG. 6 illustrates, schematically, the gas supply system according to the first exemplary embodiment of the present invention, in which a second compression member fails.

FIG. 6 illustrates, for its part, the first operating mode applied to the first exemplary embodiment, in which the second compression member 130 fails. As illustrated, in case of failure of the second compression member 130, the control member 181 is opened in order to allow the gas taken in the gaseous state from the headspace of the tank 200 to reach the first compression member 120, in which the pressure of the gas is increased to the pressure compatible with the needs of the gas-consuming appliance 300. In this figure illustrating the first operating mode, the reliquefaction system is active, that is to say the second control valve 180 is open and the first pump 140 is operating to supply the second heat exchanger 420 whereas the heat exchanger 110 is off. For these aspects, the description in FIG. 2 applies mutatis mutandis to FIG. 5.

The gas supply system 100 according to the first exemplary embodiment of the present invention thus allows an uninterrupted supply of the at least one gas-consuming appliance 300 with gas taken in the gaseous state from the headspace 201 of the tank 200, which ensures that the pressure in the tank 200 is maintained at a value acceptable for this tank 200, that is to say a pressure that is not likely to damage the latter. In parallel to this aspect, the two compression members are also designed to suck in the gas evaporated in the first pass 112 of the heat exchanger 110 at an absolute pressure of between 0.35 bar and 0.7 bar and to bring this gas to an absolute pressure of between 5 bar and 20 bar, or higher than 150 bar depending on the gas-consuming appliance 300 in question.

Figure 8:
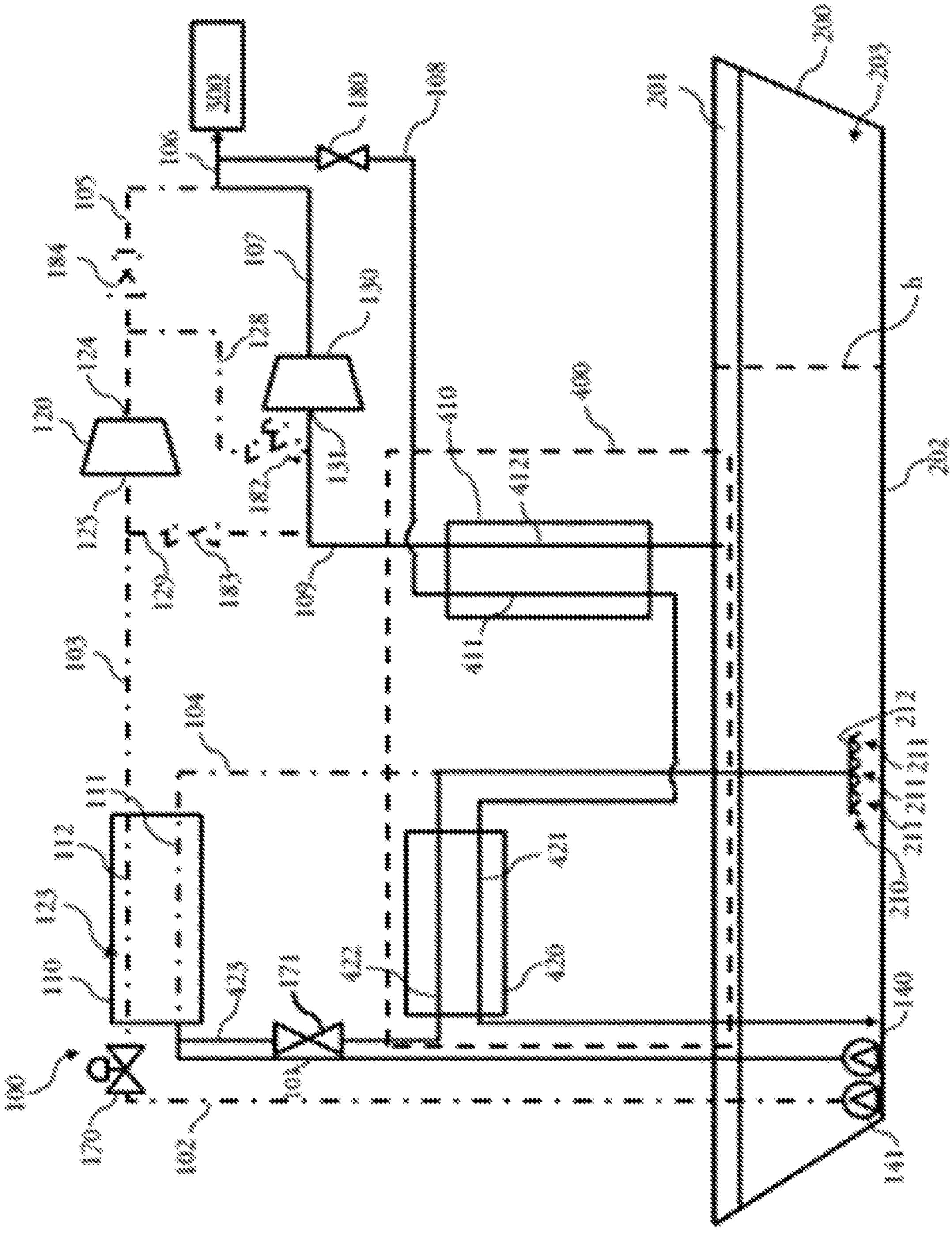
FIG. 8 illustrates, schematically, a first operating mode of the gas supply system according to the second exemplary embodiment shown in FIG. 7.

The description of the first operating mode just given with reference to the first exemplary embodiment applies, mutatis mutandis, to the first operating mode of the second exemplary embodiment shown in FIG. 8. In other words, according to the first operating mode, the second pump 141 is stopped, the pressure control means 182, the first flow control means 183 and the second flow control means 184 are all three in their closed position, and the first compression member 120 is off, the supply of the gas-consuming appliance 300 being ensured by the gas taken in a gaseous state from the headspace 201 of the tank 200 and compressed by the second compression member 130. For the operation of the reliquefaction system, the description given above with reference to FIG. 2 applies.

Figure 9:
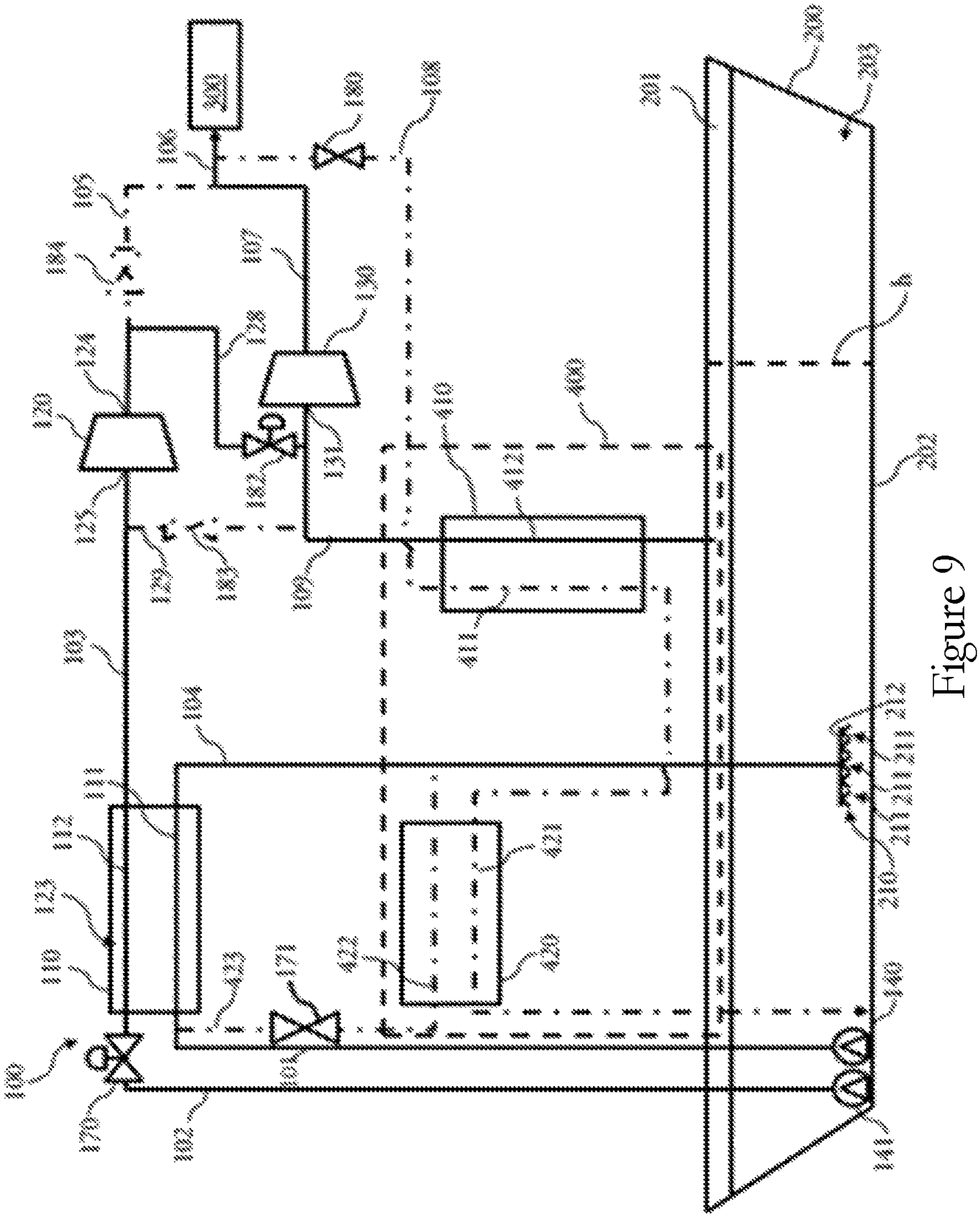
FIG. 9 illustrates, schematically, a second operating mode of the gas supply system according to the second exemplary embodiment shown in FIG. 7.

Regarding the second operating mode illustrated in FIG. 9, the system 100 according to the second exemplary embodiment differs from the first embodiment, in particular in that the first compression member 120 and the second compression member 130 operate in series, on the gas flow.

FIG. 9 illustrates this second operating mode applied to the second exemplary embodiment of the present invention. In the following description, only those features that distinguish the second operating mode applied to the second exemplary embodiment from the second operating mode applied to the first exemplary embodiment are described.

As illustrated, according to this second exemplary embodiment, the evaporated gas leaving the second pass 112 of the heat exchanger 110 is first compressed by the first compression member 120, and then flows through the first conduit 128 to the second compression member 130, where it undergoes a second compression before being supplied to the gas-consuming appliance 300. In other words, the pressure control means 182 allows gas to flow through the first conduit 128, whereas the first flow control means 183 and the second flow control means 184 are in their closed position. According to the invention, the evaporated gas leaves the heat exchanger 110 at an absolute pressure of between 0.35 bar and 0.7 bar and is compressed to an absolute pressure of between 2 bar and 6 bar, advantageously to a pressure of about 3 bar, by the first compression member 120. This gas at an absolute pressure of about 3 bar then passes through the first pipe 128, along which it undergoes an expansion operated by the pressure control means 182, that is to say its pressure is reduced to a pressure equal to, or substantially equal to, 1 bar. The gas is then compressed by the second compression member 130 to a pressure compatible with the needs of the gas-consuming appliance 300, for example a pressure of between 5 bar and 20 bar or greater than 150 bar, depending on whether the gas-consuming appliance 300 is a so-called low-pressure or high-pressure consumer.

Figure 10:
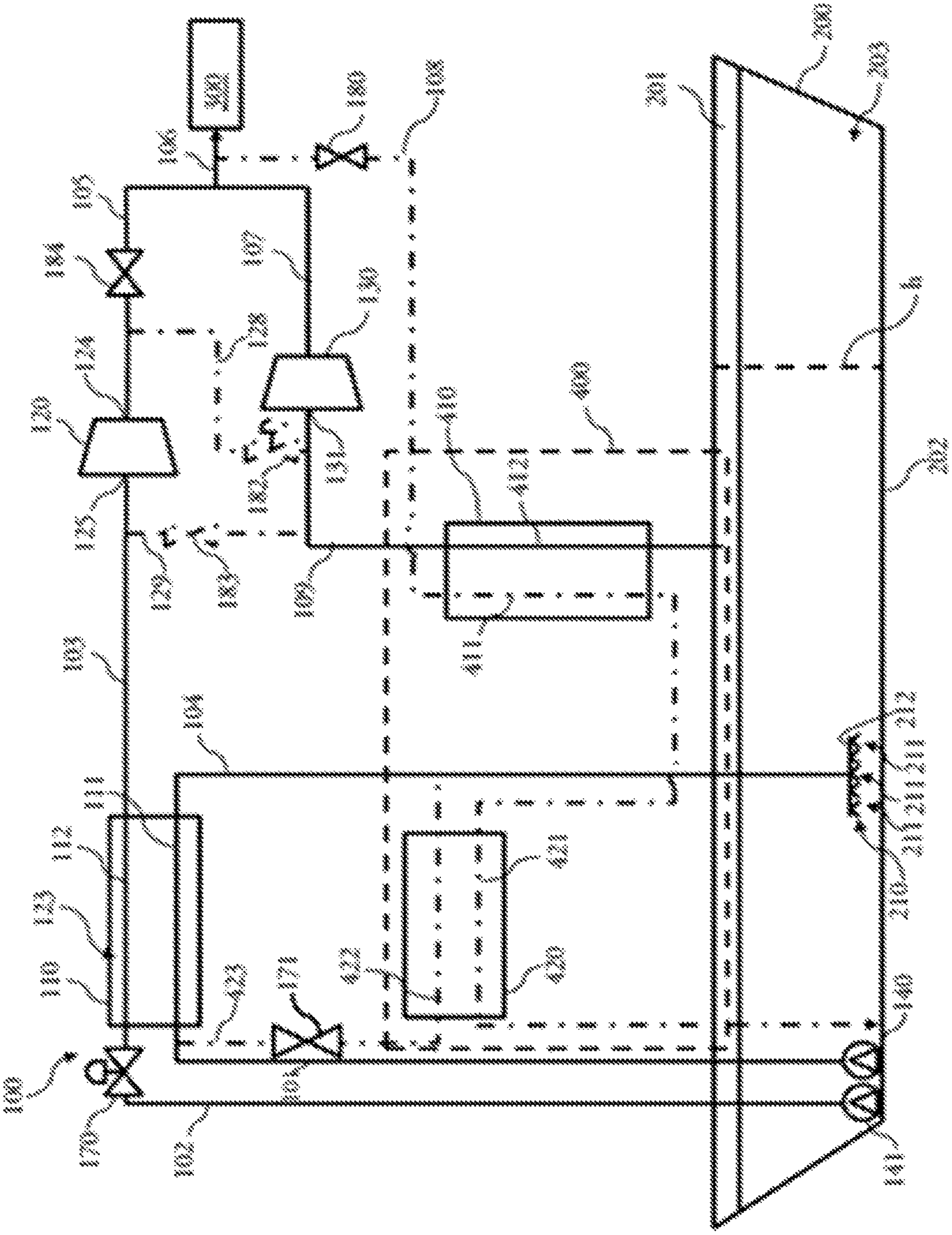
FIG. 10 illustrates, schematically, a third operating mode of the gas supply system according to the second exemplary embodiment shown in FIG. 7.

FIG. 10, for its part, illustrates a third operating mode of the second exemplary embodiment in which the at least one gas-consuming appliance 300 is supplied with gas taken in the liquid state from the tank 200, evaporated by the heat exchanger 110 and compressed by the first compression member 120, and also with gas taken in the gaseous state from the headspace 201 of the tank 200 and compressed by the second compression member 130. Thus, as illustrated, according to this third operating mode, the pressure control means 182 and the first flow control means 183 are in their closed positions whereas the second flow control means 184 is in its open position. The gas taken in the gaseous state from the headspace 201 of the tank 200 thus passes through the first heat exchanger 410, in which it does not undergo any significant change in temperature or pressure before being compressed to the pressure compatible with the needs of the gas-consuming appliance 300 by the second compression member 130, and then it is sent to this gas-consuming appliance 300. The gas taken from the tank 200 in the liquid state is evaporated thanks to the heat exchange which takes place in the heat exchanger 110 and is then compressed to the pressure compatible with the needs of the gas-consuming appliance 300 by the first compression member 120 in order to be able to then supply this gas-consuming appliance 300. Thus, according to this second exemplary embodiment, the first compression member 120 is configured to compress the gas from the heat exchanger 110 from a pressure between 0.35 bar and 0.7 bar to a pressure between 5 bar and 20 bar, or higher than 150 bar depending on the gas-consuming appliance to be supplied, and the second compression member 130 is configured to compress the gas taken in the gaseous state from the headspace 201 of the tank 200 from a pressure approximately equal to 1 bar to a pressure of between 5 bar and 20 bar or higher than 150 bar depending on the gas-consuming appliance to be supplied.

Figure 11:
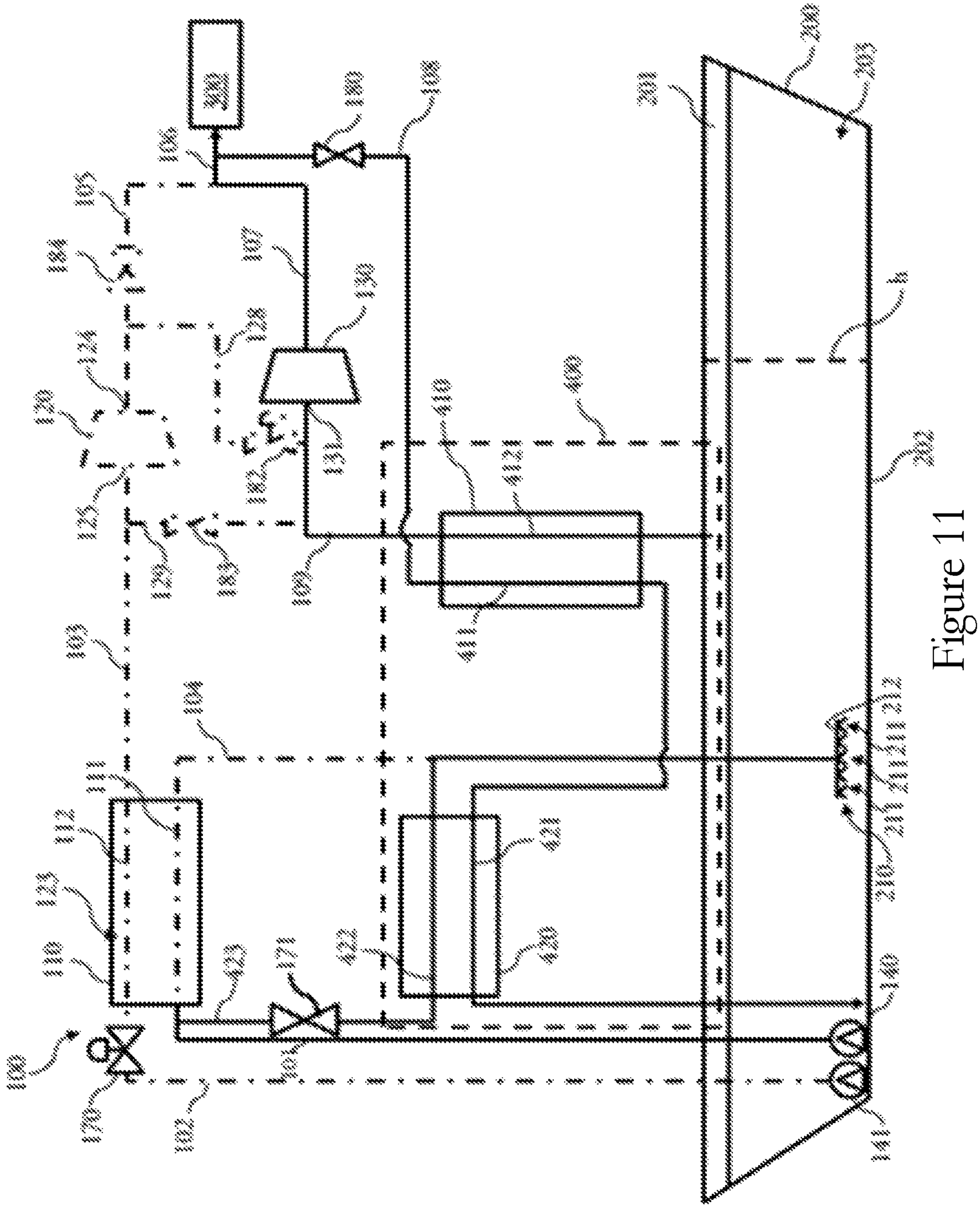
FIG. 11 illustrates, schematically, the gas supply system according to the second exemplary embodiment of the present invention in which a first compression member fails.
Figure 12:
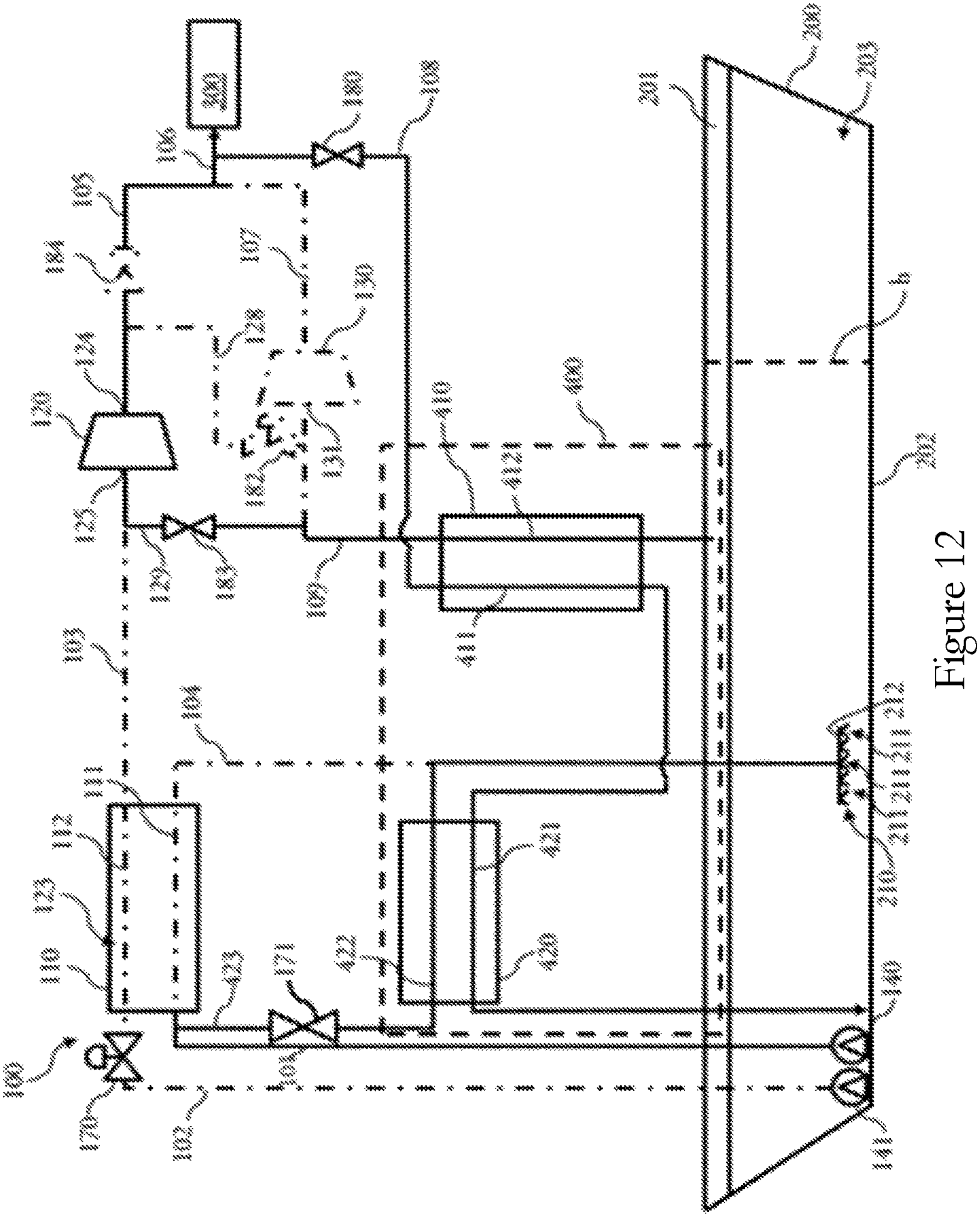
FIG. 12 illustrates, schematically, the gas supply system according to the second exemplary embodiment of the present invention, in which a second compression member fails.

In a similar manner to what has been described above with reference to FIGS. 5 and 6, the supply system 100 according to the second exemplary embodiment provides for a redundancy of the compression members 120, 130 in order to ensure, on the one hand, a continuous supply of the gas-consuming appliance 300 and, on the other hand, a maintenance of the pressure in the tank 200 at a value acceptable for this tank 200. FIGS. 11 and 12 illustrate this redundancy of the compression members 120, 130.

FIG. 11 illustrates the gas supply system 100 according to the second exemplary embodiment of the present invention in which the first compression member 120 fails. As shown, in the event of failure of the first compression member 120, the supply of the gas-consuming appliance 300 with gas taken in the gaseous state from the headspace 201 of the tank 200 is ensured by the second compression member 130, the pressure control means 182, the first flow control means 183 and the second flow control means 184 all being in their closed position, that is to say prohibiting the circulation of gas, respectively, in the first conduit 128, in the second conduit 129 and in the fifth conduit 105. In this situation, this FIG. 9 illustrates a mode identical to the first operating mode of the system 100 illustrated in FIG. 8 and reference may be made to the description made above with reference to this FIG. 8.

FIG. 12 illustrates the system 100 for supplying gas to at least one gas-consuming appliance 300 according to the second exemplary embodiment of the present invention in which the second compression member 130 fails. In this situation, the pressure control means 182 is moved to its closed position, so that no gas flows through the first conduit 128, the first flow control means 183 is moved to its open position, and the second flow control means 184 is also moved to its open position. Thus, the gas taken in the gaseous state from the headspace 201 of the tank 200 passes through the second conduit 129 to reach the first compression member 120 configured to compress the gas to the pressure compatible with the needs of the gas-consuming appliance 300. The gas thus compressed then passes through the fifth conduit 105 and the sixth conduit 106 to reach the gas-consuming appliance 300. The second pump 141, for its part, is stopped so that no heat exchange takes place in the heat exchanger 110.

Thus, the system 100 according to the second exemplary embodiment makes it possible to supply the gas-consuming appliance 300 with gas taken in the gaseous state from the headspace 201 of the tank 200, thus ensuring that the pressure in the tank 200 is maintained at an acceptable value for this tank 200 under all circumstances, and in particular in the event of failure of the first compression member 120 or the second compression member 130.

Figure 13:
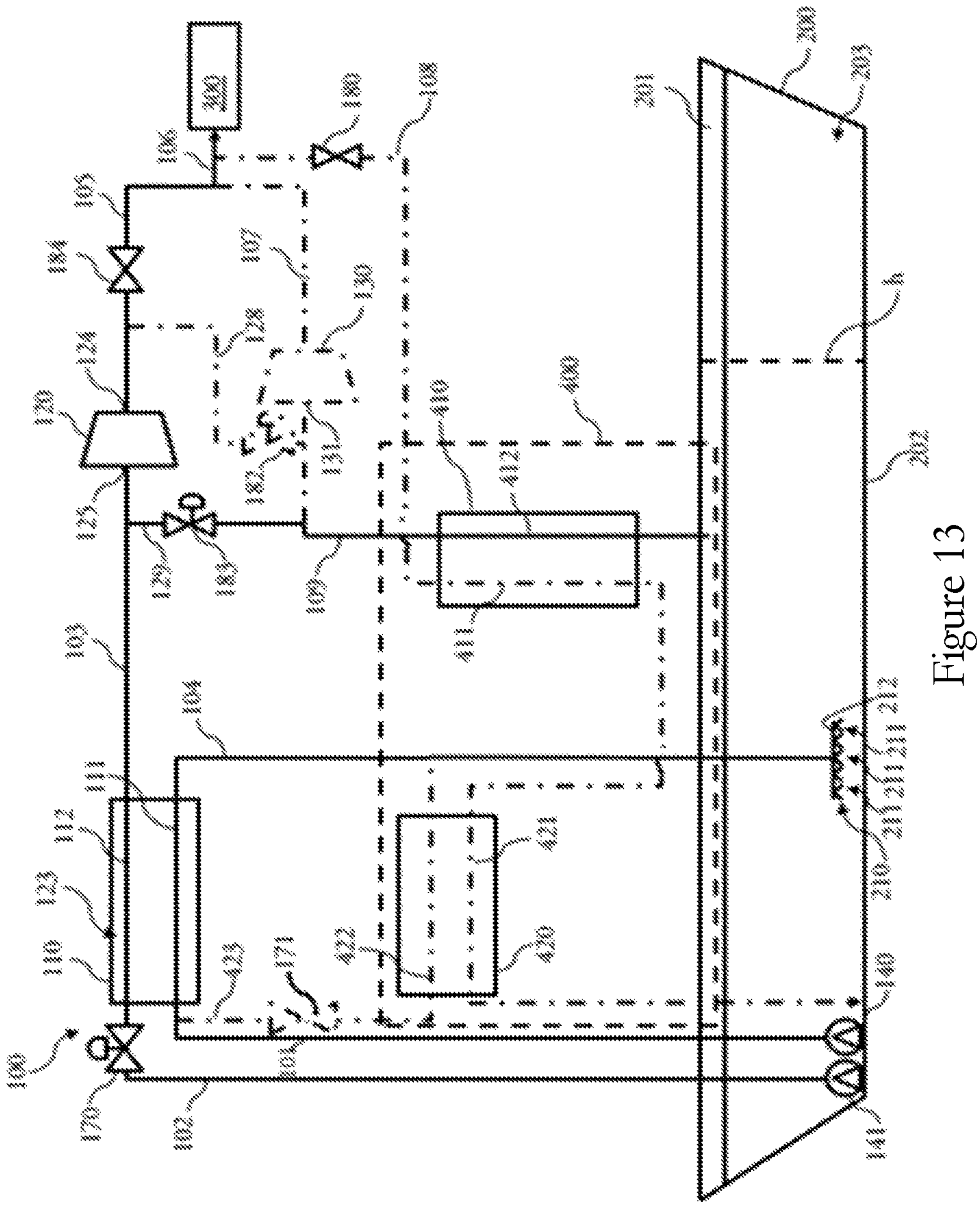
FIG. 13 illustrates, schematically, a fourth operating mode of the gas supply system according to the second exemplary embodiment shown in FIG. 7
Figure 14:
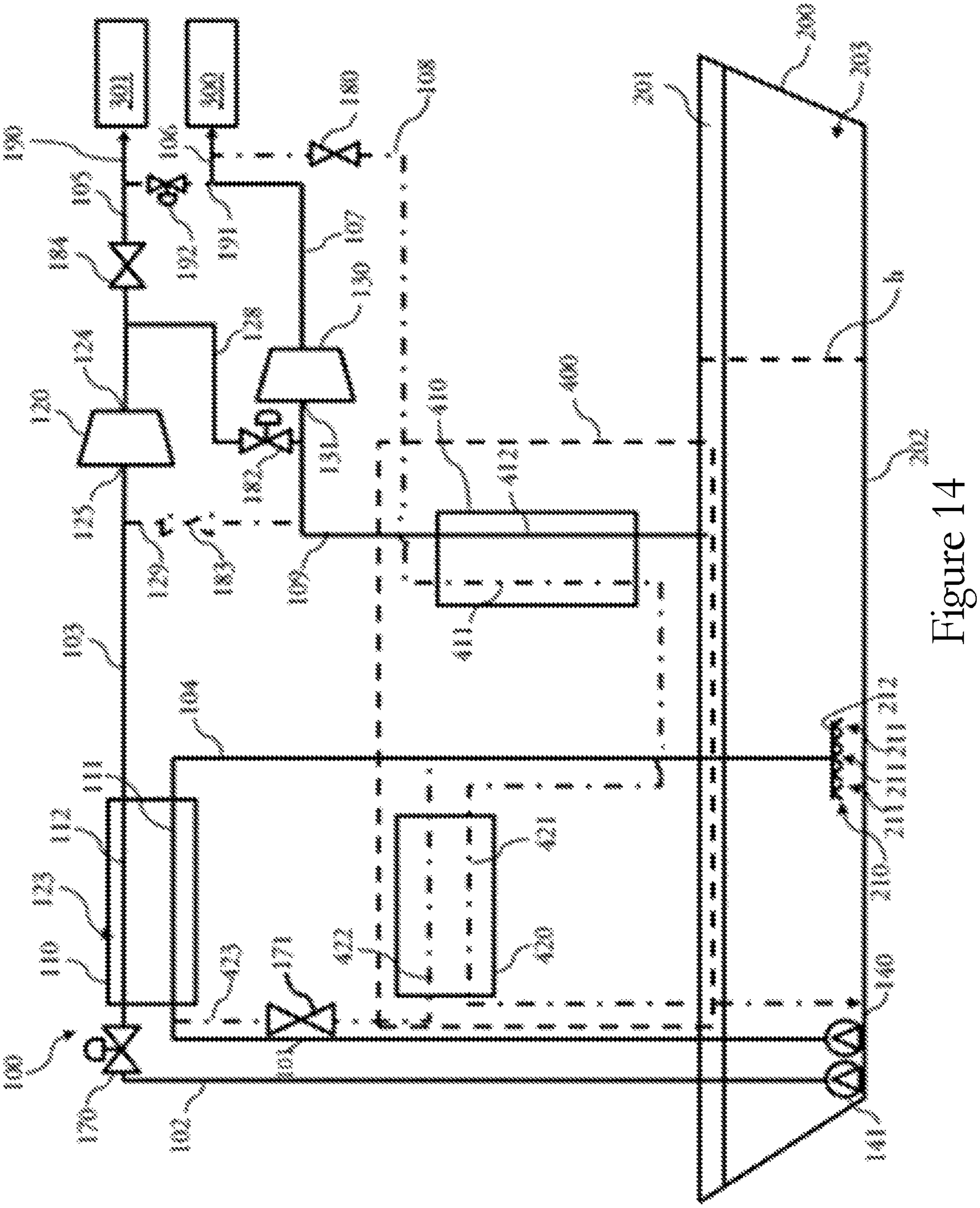
FIG. 14 illustrates, schematically, a fifth operating mode of the gas supply system according to the second exemplary embodiment shown in FIG. 7

FIGS. 13 and 14 illustrate a fourth operating mode and a fifth operating mode of the system 100 according to the second exemplary embodiment of the present invention.

FIG. 13 thus illustrates the fourth operating mode of the system 100. According to this fourth operating mode, the first flow control means 183 carried by the second conduit 129 is a pressure control member. This fourth operating mode corresponds to an operating mode in which the quantity of gas taken in the gaseous state from the headspace 201 of the tank 200 is insufficient to properly supply the at least one gas-consuming appliance 300. Therefore, the first pump 140 is operated so as to allow the supply of the at least one gas-consuming appliance 300 with gas evaporated by the heat exchanger 110. Furthermore, according to this fourth operating mode, the gas circulation in the seventh conduit 107 is interrupted—for example by means of an all-or-nothing valve not illustrated here—so that the gas taken in the gaseous state from the headspace 201 of the tank 200 is directed towards the second conduit 129, along which it undergoes an expansion effected by the first flow control means 183. The gas taken at a pressure of about 1 bar absolute is thus expanded to a pressure of between 0.35 bar and 0.7 bar so that it can be mixed with the gas taken in the liquid state from the tank 200 and evaporated by the heat exchanger 110, then compressed by the first compression member 120 and finally used to supply the gas-consuming appliance 300. In other words, this fourth operating mode advantageously makes it possible to supply the first compression member 120 with gas taken in the liquid state from the tank 200 and evaporated by the heat exchanger 110 and with gas taken in the gaseous state from the headspace 201 of the tank 200 through the same inlet 125 of this first compression member 120.

FIG. 14, for its part, illustrates the fifth operating mode of the system 100 according to the second exemplary embodiment. According to this fifth illustrated operating mode, the system 100 is configured to supply two gas-consuming appliances 300, 301, a first gas-consuming appliance 300 being configured to be supplied with gas at a first pressure and a second gas-consuming appliance 301 being configured to be supplied with gas at a second pressure, the second pressure being lower than the first pressure.

According to this fifth operating mode, a tenth conduit 190 extends between the second flow control means 184 and the second gas-consuming appliance 301, so that the first compression member 120 and the second compression member 130 are able to supply, in parallel and independently of each other, the first gas-consuming appliance 300 and the second gas-consuming appliance 301. An eleventh conduit 191 is also arranged between this tenth conduit 190 and the sixth conduit 106 connected to the first gas-consuming appliance 300, this eleventh conduit 191 carrying a pressure control member 192.

This fifth operating mode illustrated in FIG. 14 corresponds to an operating mode in which the quantity of gas present in the gaseous state in the headspace 201 of the tank 200 is insufficient to properly supply the gas-consuming appliances 300, 301, so that the first pump 140 is put into operation and supplies the heat exchanger 110. In a manner similar to what has been described previously, the gas taken in the liquid state from the tank 200 is thus evaporated as it passes through the heat exchanger 110 and can then participate in the supply of the gas-consuming appliances 300, 301. Thus, according to this fifth operating mode, the first compression member 120 is configured to compress the gas taken in the liquid state from the tank 200 and evaporated as it passes through the heat exchanger 110 from an absolute pressure of between 0.35 bar and 0.7 bar to a pressure of between 2 bar and 6 bar, that is to say a pressure corresponding to the supply pressure of the second gas-consuming appliance 301. The second compression member 130, for its part, is configured to compress the gas taken in the gaseous state from the headspace 201 of the tank 200 from a pressure of about 1 bar absolute to a pressure of between 5 bar and 20 bar, which corresponds to the supply pressure of the first gas-consuming appliance 300.

Optionally, the pressure control member 192 carried by the eleventh conduit 191 can be put in an open position, thus allowing the passage of gas compressed by the second compression member 130 in this eleventh conduit 191. The gas coming from this second compression member 130 is thus expanded so as to be able to supply the second gas-consuming appliance 301 if necessary.

More particularly, FIG. 14 illustrates a situation in which the amount of gas taken in the liquid state and evaporated by the heat exchanger 110 is greater than the amount of gas required to supply the second gas-consuming appliance 301. In this case, the pressure control means 182 carried by the first conduit 128 is put in its open position so as to allow the passage of the gas compressed by the first compression member 120 in this first conduit 128. As previously mentioned, the control means 182 is configured to reduce the pressure of the gas passing through it. Thus, the gas leaving the first compression member 120 at a pressure of between 2 bar and 6 bar undergoes an expansion operated by the control means 182 to a pressure of about 1 bar, and can thus be mixed with the gas taken in the gaseous state from the headspace 201 of the tank 200 to be compressed by the second compression member 130 to a pressure of between 5 bar and 20 bar in order to be able to then supply the first gas-consuming appliance 300.

The description of the redundancy systems provided in case of failure of the first compression member 120 or the second compression member 130 given previously with reference to FIGS. 11 and 12 applies, mutatis mutandis, to these fourth and fifth modes of operation.

Figure 15:
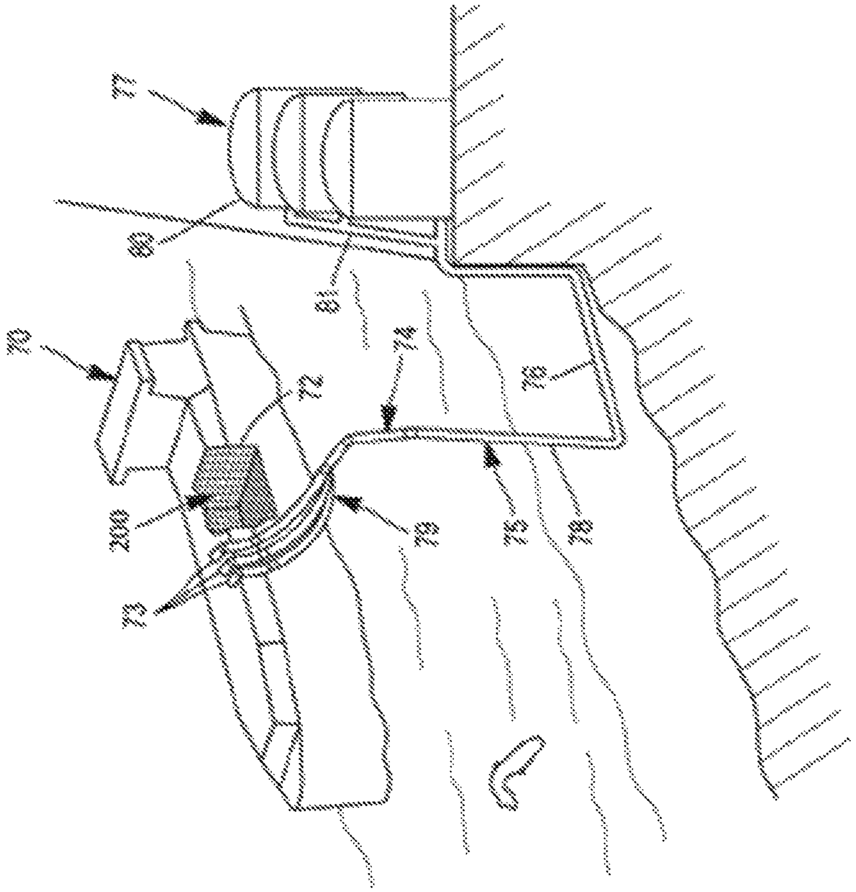
FIG. 15 is a basic schematic representation of an LNG carrier tank and a terminal for loading and/or unloading this tank.

Lastly, FIG. 15 is a basic view of a ship 70 that shows the tank 200 that contains the natural gas in both liquid and gaseous states, this tank 200 being generally prismatic in shape mounted in a double hull 72 of the ship. This tank 200 can be part of an LNG carrier, but it can also be a reservoir when the gas is operated as a fuel for the gas-consuming appliance.

The wall of the tank 200 comprises a primary sealing membrane intended to be in contact with the gas in a liquid state contained in the tank, a secondary sealing membrane arranged between the primary sealing membrane and the double hull 72 of the ship 70, and two insulating barriers arranged respectively between the primary sealing membrane and the secondary sealing membrane and between the secondary sealing membrane and the double hull 72.

Loading and/or unloading pipelines 73 arranged on the upper deck of the ship can be connected, by means of appropriate connectors, to a marine or port terminal to transfer the cargo of natural gas in a liquid state from or to the tank 200.

FIG. 15 also depicts an example of a marine terminal having a loading and/or unloading station 75, a submarine pipeline 76, and an onshore facility 77. The loading and/or unloading station 75 is a fixed offshore facility having a movable arm 74 and a tower 78 that supports the movable arm 74. The movable arm 74 carries a bundle of insulated pipes 79 that can connect to the loading and/or unloading pipes 73. The movable arm 74 can be rotated to fit any ship size. The loading and unloading station 75 allows the loading and/or unloading of the ship 70 from or to the shore facility 77. The latter comprises liquefied gas storage tanks 80 and connection conduits 81 connected by the submarine pipeline 76 to the loading or unloading station 75. The submarine pipeline 76 allows the transfer of liquefied gas between the loading or unloading station 75 and the onshore facility 77 over a large distance, for example five km, which allows the ship 70 to be kept at a large distance from the coast during loading and/or unloading operations.

To generate the pressure necessary for the transfer of the liquefied gas, one or more unloading pumps carried by the loading and/or unloading tower of the tank 200 and/or pumps equipping the onshore facility 77 and/or pumps equipping the loading and unloading station 75 are used.

Of course, the invention is not limited to the examples just described, and many adjustments can be made to these examples without departing from the scope of the invention.

The present invention thus proposes a system for supplying gas to at least one gas-consuming appliance which makes it possible to supply the gas-consuming appliances present on a ship while ensuring that a pressure in the tank equipping this ship and containing the gas is maintained at a value acceptable for this tank in all circumstances and, advantageously, at a limited cost since only two compression members are required.

The present invention, however, is not limited to the means and configurations described and illustrated herein, and also extends to any equivalent means and configurations as well as to any technically feasible combination of such means. In particular, the features described with reference to the various exemplary embodiments can be combined insofar as they are not incompatible with each other.

The invention claimed is:

1. A gas supply system for supplying gas to at least one gas-consuming appliance equipping a ship, the supply system comprising:

one gas supply line for supplying gas to the at least one gas-consuming appliance, said gas supply line being configured to be passed through by gas taken in the liquid state from a tank and subjected to a pressure lower than a pressure of the gas in a headspace of the tank;

one first compression member configured to compress the gas from the gas supply line for supplying gas to the at least one gas-consuming appliance; and one second compression member, wherein the first compression member and the second compression member alternately compress the gas in the gaseous state from the gas supply line and the gas taken in the gaseous state from the headspace of the tank, wherein at least one pipeline is arranged between the headspace of the tank and an intermediate inlet of the first compression member, at least one control member being arranged on the at least one pipeline, and wherein the intermediate inlet of the first compression member is arranged so that the gas taken in the gaseous state from the headspace of the tank mixes with an evaporated gas at a point of the first compression member at which this evaporated gas is already compressed to the pressure of the gas present in the headspace of the tank.

2. The gas supply system as claimed in claim 1, comprising at least one heat exchanger configured to implement a heat exchange between the gas which flows in the supply line and gas taken in the liquid state from the tank.

3. The gas supply system as claimed in claim 2, wherein the heat exchanger is equipped with at least one first pass configured to be supplied with the gas taken in the liquid state from the tank of the ship and at least one second pass configured to be supplied with the gas subjected to a pressure lower than the pressure of the gas in the headspace of the tank.

4. The gas supply system as claimed in claim 3, comprising at least one first pump configured to supply the first pass of the heat exchanger, one second pump configured to supply the second pass of the heat exchanger, at least one expansion means being arranged on the supply line, between the second pump and the second pass of the heat exchanger.

5. The gas supply system as claimed in claim 1, wherein the first compression member and the second compression member suck in the gas taken from the headspace of the tank.

6. The gas supply system as claimed in claim 1, comprising as a compression member only the first compression member and the second compression member.

7. The gas supply system as claimed in claim 1, comprising at least one reliquefaction system for gas compressed by the first compression member and/or by the second compression member.

8. The gas supply system as claimed in claim 7, in which the reliquefaction system comprises at least one first heat exchanger equipped with at least one first pass configured to be passed through by gas compressed by the first compression member and/or by the second compression member and with at least one second pass configured to be passed through by gas taken in the gaseous state from the headspace of the tank.

9. The gas supply system as claimed in claim 8, wherein the reliquefaction system comprises at least one second heat exchanger configured to implement a heat exchange between compressed gas leaving the first pass of the first heat exchanger and gas taken in the liquid state from the tank.

10. The gas supply system as claimed in claim 1, wherein the first compression member is configured to be supplied with gas having a pressure between 0.35 and 0.7 bar and to compress this gas to a pressure between 2 bar and 13 bar, and wherein the second compression member is configured to be supplied with gas having a pressure equivalent to 1 bar and to compress it to a pressure between 5 bar and 20 bar.

11. The gas supply system as claimed in claim 1, wherein the first compression member and the second compression member are connected in series with each other.

12. The gas supply system as claimed in claim 11, wherein at least one first conduit is arranged between an outlet of the first compression member and an inlet of the second compression member, at least one pressure control means being arranged on this at least one first conduit.

13. The gas supply system as claimed in claim 12, wherein at least one second conduit is arranged between an outlet of the second pass of the first heat exchanger and an inlet of the first compression member, at least one first flow control means being arranged on this at least one second conduit.

14. The gas supply system as claimed in claim 11, wherein the first compression member is configured to be supplied with gas having a pressure of between 0.35 bar and 0.7 bar and to compress it to a pressure of between 2 bar and 6 bar, and wherein the second compression member is configured to be supplied with gas having a pressure equivalent, or substantially equivalent, to 1 bar and to compress it to a pressure of between 5 bar and 20 bar.

15. The ship for transporting liquefied gas, comprising the at least one tank of a liquefied gas cargo, the at least one evaporated-gas-consuming appliance and the at least one system for supplying gas to the at least one gas-consuming appliance as claimed in claim 1.

16. The ship as claimed in claim 15, comprising at least one first gas-consuming appliance configured to be supplied with gas compressed at a first pressure, and at least one second gas-consuming appliance configured to be supplied with gas compressed at a second pressure, the first gas-consuming appliance and the second gas-consuming appliance both being configured to be supplied by the at least one supply system, and the first supply pressure of the first gas-consuming appliance being higher than the second supply pressure of the second gas-consuming appliance.

17. A gas supply system for loading or unloading a gas in a liquid state which combines at least one onshore means and at least one ship for transporting gas in the liquid state as claimed in claim 16.

18. A method for loading or unloading the gas in a liquid state from the ship for transporting gas as claimed in claim 15.

* * * * *